(12) United States Patent
O'Shaughnessy et al.

(10) Patent No.: US 11,786,074 B2
(45) Date of Patent: Oct. 17, 2023

(54) GRILL ASSEMBLY WITH FOLDABLE CART

(71) Applicant: OHC IP Holdings, LLC, Eden Prairie, MN (US)

(72) Inventors: Michael L. O'Shaughnessy, Edina, MN (US); James A. Mitlyng, Eagan, MN (US); Thomas E. McKinney, II, Minnetonka, MN (US)

(73) Assignee: OHC IP Holdings, LLC, Edina, MN (US)

( * ) Notice: Subject to any disclaimer, the term of this patent is extended or adjusted under 35 U.S.C. 154(b) by 0 days.

(21) Appl. No.: 17/951,768

(22) Filed: Sep. 23, 2022

(65) Prior Publication Data

US 2023/0084244 A1 Mar. 16, 2023

Related U.S. Application Data

(63) Continuation of application No. 17/008,331, filed on Aug. 31, 2020, now Pat. No. 11,457,770, which is a
(Continued)

(51) Int. Cl.
*A47J 37/07* (2006.01)

(52) U.S. Cl.
CPC ....... *A47J 37/0713* (2013.01); *A47J 37/0786* (2013.01); *A47J 2037/0777* (2013.01)

(58) Field of Classification Search
CPC ................ A47J 37/07; A47J 2037/0777; A47J 37/0763; A47J 37/0704
(Continued)

(56) References Cited

U.S. PATENT DOCUMENTS

| 1,758,144 A * | 5/1930 | Caselman ................. B62B 3/00 280/651 |
| 3,683,791 A | 8/1972 | Rast |

(Continued)

FOREIGN PATENT DOCUMENTS

| CN | 201005546 | 1/2008 |
| CN | 202801180 | 3/2013 |

(Continued)

OTHER PUBLICATIONS

"Brown Jordan Outdoor Kitchens," by Danver Stainless Outdoor Kitchens information booklet, Apr. 2018 (28 pages).
(Continued)

*Primary Examiner* — Ko-Wei Lin
(74) *Attorney, Agent, or Firm* — Pauly, DeVries Smith & Deffner LLC

(57) ABSTRACT

In an embodiment, a grill is provided. The grill can include a grill cart and a burner box. The grill cart configured to be transitioned between an upright state and a folded state. The coupling between a first side frame and a base is located in a first plane that is substantially parallel with a plane defined by a bottom plate of the base, and the coupling between a second side frame and the bottom plate of the base is located in a second plane that is substantially parallel with the plane defined by the bottom plate. The first plane is located a first distance away from the plane defined by the bottom plate and the second plane is located a second distance away from the plane defined by the bottom plate. The first distance is not equivalent to the second distance. Other embodiments are also included herein.

20 Claims, 23 Drawing Sheets

Related U.S. Application Data continuation of application No. 16/450,541, filed on Jun. 24, 2019, now Pat. No. 10,772,466.

(60) Provisional application No. 62/690,700, filed on Jun. 27, 2018.

(58) Field of Classification Search
USPC .............................. 126/25 R, 9 R, 9 B, 41 R
See application file for complete search history.

(56) References Cited

U.S. PATENT DOCUMENTS

| | | | |
|---|---|---|---|
| 3,802,413 A | 4/1974 | Pepin | |
| 3,893,686 A * | 7/1975 | Morgan | B62B 3/002 280/651 |
| 4,057,165 A * | 11/1977 | Kardell | B65D 19/18 16/268 |
| 4,211,206 A | 7/1980 | Darbo | |
| 4,321,857 A * | 3/1982 | Best | A47J 37/06 126/41 R |
| 4,362,093 A * | 12/1982 | Griscom | A47J 37/0704 126/25 R |
| 4,505,495 A * | 3/1985 | Foss | B62B 3/02 16/113.1 |
| 4,569,327 A * | 2/1986 | Velten | A47J 37/0763 126/25 R |
| 4,577,772 A | 3/1986 | Bigliardi | |
| 4,674,647 A * | 6/1987 | Gyenge | B65D 19/18 220/6 |
| 4,848,316 A * | 7/1989 | Beller | F24B 1/207 99/357 |
| 4,887,836 A * | 12/1989 | Simjian | B62B 3/007 280/651 |
| 4,949,701 A * | 8/1990 | Krosp | A47J 37/0713 126/41 R |
| 4,984,515 A | 1/1991 | Pivonka | |
| 5,040,809 A | 8/1991 | Yang | |
| 5,050,731 A | 9/1991 | Baynes et al. | |
| 5,065,734 A | 11/1991 | Elliott | |
| 5,261,550 A | 11/1993 | Karpisek | |
| 5,318,322 A | 6/1994 | Horne | |
| 5,462,318 A | 10/1995 | Cooke | |
| 5,473,845 A | 12/1995 | Livingston et al. | |
| 5,579,755 A | 12/1996 | Johnston | |
| 5,692,814 A | 12/1997 | Chou | |
| 5,738,365 A * | 4/1998 | McCarthy | B62B 3/022 280/651 |
| 5,884,554 A | 3/1999 | Sprick | |
| 5,941,229 A | 8/1999 | Schlosser et al. | |
| 6,026,751 A | 2/2000 | Tsai | |
| 6,039,039 A | 3/2000 | Pina | |
| 6,079,777 A * | 6/2000 | Simmons | A47C 13/00 297/30 |
| 6,189,528 B1 | 2/2001 | Oliver | |
| 6,257,229 B1 * | 7/2001 | Stewart | A47J 37/0786 126/41 R |
| 6,267,111 B1 | 7/2001 | Burton | |
| 6,308,616 B1 | 10/2001 | Johnson | |
| 6,316,837 B1 | 11/2001 | Song | |
| 6,401,953 B2 * | 6/2002 | Kofod | B65D 88/126 220/826 |
| 6,439,111 B1 | 8/2002 | Lu | |
| 6,439,220 B1 | 8/2002 | Johnson | |
| 6,439,221 B1 | 8/2002 | Ward et al. | |
| D462,227 S | 9/2002 | Alden et al. | |
| 6,494,419 B2 | 12/2002 | Pai | |
| 6,532,951 B1 | 3/2003 | Sallie et al. | |
| 6,606,986 B2 | 8/2003 | Holland et al. | |
| 6,619,600 B1 | 9/2003 | Johnson et al. | |
| 6,651,361 B1 * | 11/2003 | Porter | E02F 5/12 37/355 |
| D485,467 S | 1/2004 | Pai | |
| 6,708,601 B2 * | 3/2004 | Horne | A47J 37/0768 99/450 |
| D491,414 S | 6/2004 | Nichols et al. | |
| 6,792,880 B2 | 9/2004 | Tsai | |
| 6,823,858 B1 | 11/2004 | Chen | |
| 6,916,028 B2 | 7/2005 | Shapiro | |
| 7,080,640 B2 | 7/2006 | Sanders et al. | |
| D533,011 S | 12/2006 | Pai | |
| D541,576 S | 5/2007 | Lutz | |
| D546,616 S | 7/2007 | Tseng | |
| D546,624 S | 7/2007 | Pai | |
| D547,108 S | 7/2007 | Tseng | |
| D547,109 S | 7/2007 | Tseng | |
| D549,035 S | 8/2007 | Chung | |
| 7,360,783 B2 * | 4/2008 | Horne | B62B 3/022 312/258 |
| 7,562,897 B1 * | 7/2009 | Sherman | B62B 3/025 211/186 |
| D615,799 S | 5/2010 | Best et al. | |
| D618,951 S | 7/2010 | Tzeng | |
| 7,753,047 B1 | 7/2010 | Trammell | |
| 7,856,924 B1 | 12/2010 | Stihi | |
| 8,042,829 B2 | 10/2011 | Hailston et al. | |
| 8,316,837 B2 | 11/2012 | Malumyan | |
| 8,347,874 B2 | 1/2013 | Bruno et al. | |
| 8,479,928 B2 | 7/2013 | Tanabe et al. | |
| 8,522,769 B2 | 9/2013 | Ducate et al. | |
| 8,602,017 B2 | 12/2013 | May et al. | |
| RE44,770 E | 2/2014 | Nichols et al. | |
| 8,839,780 B1 | 9/2014 | Bennett et al. | |
| D737,096 S | 8/2015 | Lee et al. | |
| 9,101,244 B2 | 8/2015 | Samaras | |
| 9,187,108 B2 | 11/2015 | Bruno et al. | |
| 9,211,036 B2 | 12/2015 | May et al. | |
| 9,316,401 B1 | 4/2016 | Guste | |
| 9,392,904 B2 | 7/2016 | Garman | |
| D798,645 S | 10/2017 | Lira-nunez et al. | |
| D799,885 S | 10/2017 | Torchon | |
| 9,783,216 B2 | 10/2017 | Alden et al. | |
| 9,788,690 B2 | 10/2017 | Rosian | |
| D803,613 S | 11/2017 | Dominique | |
| 9,817,108 B2 | 11/2017 | Kuo et al. | |
| D805,332 S | 12/2017 | Price et al. | |
| D805,819 S | 12/2017 | Price et al. | |
| D807,105 S | 1/2018 | Moss | |
| D820,010 S | 6/2018 | Reyes | |
| 10,689,018 B2 | 6/2020 | Patton et al. | |
| 10,702,099 B2 | 7/2020 | O'Shaughnessy et al. | |
| 10,772,466 B2 | 9/2020 | O'Shaughnessy et al. | |
| D899,176 S | 10/2020 | Lien | |
| 10,966,569 B2 | 4/2021 | O'Shaugnessy et al. | |
| 11,033,147 B2 | 6/2021 | O'Shaughnessy et al. | |
| 11,045,049 B2 | 6/2021 | O'Shaughnessy et al. | |
| D923,996 S | 7/2021 | O'Shaughnessy et al. | |
| D924,002 S | 7/2021 | O'Shaughnessy et al. | |
| D926,519 S | 8/2021 | O'Shaughnessy et al. | |
| D928,544 S | 8/2021 | O'Shaughnessy et al. | |
| 11,096,521 B2 | 8/2021 | O'Shaughnessy et al. | |
| 11,352,038 B2 | 6/2022 | Patton et al. | |
| 11,457,770 B2 | 10/2022 | O'Shaughnessy et al. | |
| 11,464,363 B2 | 10/2022 | O'Shaughnessy et al. | |
| 11,667,314 B2 | 6/2023 | Patton et al. | |
| 2001/0015137 A1 | 8/2001 | Ogrady et al. | |
| 2003/0136781 A1 * | 7/2003 | Rumpel | B65D 21/0201 220/6 |
| 2004/0020482 A1 | 2/2004 | Chen | |
| 2004/0065313 A1 | 4/2004 | Thompson | |
| 2004/0183266 A1 | 9/2004 | Cambiano et al. | |
| 2006/0000468 A1 | 1/2006 | Zelek et al. | |
| 2006/0049725 A1 | 3/2006 | Simon | |
| 2006/0225725 A1 | 10/2006 | Rinaldo | |
| 2006/0272630 A1 * | 12/2006 | Sanders | A47J 33/00 126/9 R |
| 2007/0089724 A1 * | 4/2007 | Horne | A47J 37/0704 126/9 R |
| 2007/0152414 A1 * | 7/2007 | Horne | B62B 3/022 280/47.35 |
| 2008/0066730 A1 | 3/2008 | Ducate | |
| 2008/0163862 A1 | 7/2008 | Cartwright | |
| 2008/0245357 A1 | 10/2008 | Meether et al. | |
| 2009/0165771 A1 | 7/2009 | Selk | |

(56) References Cited

U.S. PATENT DOCUMENTS

| | | | |
|---|---|---|---|
| 2010/0031950 | A1 | 2/2010 | Paslawski |
| 2010/0269814 | A1* | 10/2010 | May .................... A47J 37/0704 |
| | | | 206/576 |
| 2010/0326938 | A1 | 12/2010 | Zhu et al. |
| 2011/0025005 | A1* | 2/2011 | Howell .................... B62B 7/10 |
| | | | 280/47.24 |
| 2011/0041831 | A1 | 2/2011 | Dettloff |
| 2011/0168155 | A1 | 7/2011 | Gallo |
| 2011/0168168 | A1 | 7/2011 | Schneider |
| 2011/0168593 | A1* | 7/2011 | Neufeld ............. B65D 19/0012 |
| | | | 206/386 |
| 2012/0012091 | A1 | 1/2012 | Home |
| 2012/0017890 | A1 | 1/2012 | May et al. |
| 2012/0024280 | A1* | 2/2012 | Laporta ............... A47J 37/0623 |
| | | | 126/25 R |
| 2013/0049311 | A1 | 2/2013 | Metters et al. |
| 2013/0112088 | A1* | 5/2013 | May ........................ A47J 37/07 |
| | | | 99/421 H |
| 2013/0134842 | A1 | 5/2013 | Kassanoff et al. |
| 2013/0312732 | A1 | 11/2013 | Brennan |
| 2014/0014087 | A1 | 1/2014 | Rosa et al. |
| 2014/0069412 | A1 | 3/2014 | Garman |
| 2014/0090635 | A1 | 4/2014 | May |
| 2014/0165992 | A1 | 6/2014 | May et al. |
| 2014/0261394 | A1 | 9/2014 | Evans et al. |
| 2015/0013667 | A1* | 1/2015 | Ho ...................... A47J 37/0763 |
| | | | 126/9 B |
| 2015/0020796 | A1* | 1/2015 | Garman ............. A47J 37/0704 |
| | | | 126/9 B |
| 2015/0023839 | A1 | 1/2015 | Snyder et al. |
| 2015/0118006 | A1 | 4/2015 | Wallace-riley |
| 2015/0136113 | A1 | 5/2015 | Polter et al. |
| 2015/0165634 | A1* | 6/2015 | Golomb .................. B26D 3/26 |
| | | | 83/167 |
| 2015/0342401 | A1 | 12/2015 | Alden et al. |
| 2016/0039326 | A1 | 2/2016 | Smith et al. |
| 2016/0100714 | A1 | 4/2016 | Dokhanian et al. |
| 2016/0208837 | A1* | 7/2016 | Chang ................. A47J 37/0704 |
| 2016/0305172 | A1 | 10/2016 | Grisendi |
| 2017/0085114 | A1 | 3/2017 | Gao et al. |
| 2017/0095114 | A1* | 4/2017 | O'Shaughnessy ........ B62B 3/02 |
| 2017/0143162 | A1 | 5/2017 | Olsen |
| 2017/0159941 | A1* | 6/2017 | Kahler ................ A47J 37/0713 |
| 2018/0008095 | A1 | 1/2018 | Bennett et al. |
| 2018/0132660 | A1 | 5/2018 | Suchevits |
| 2018/0141576 | A1 | 5/2018 | Leffler et al. |
| 2018/0280677 | A1 | 10/2018 | Knight |
| 2018/0290677 | A1 | 10/2018 | Patton et al. |
| 2018/0310765 | A1 | 11/2018 | May et al. |
| 2019/0380533 | A1 | 12/2019 | Lien |
| 2020/0000277 | A1 | 1/2020 | O'Shaughnessy et al. |
| 2020/0000278 | A1 | 1/2020 | O'Shaughnessy et al. |
| 2020/0000279 | A1 | 1/2020 | O'Shaughnessy et al. |
| 2020/0000280 | A1 | 1/2020 | O'Shaughnessy et al. |
| 2020/0000281 | A1 | 1/2020 | O'Shaughnessy et al. |
| 2020/0000283 | A1 | 1/2020 | O'Shaughnessy et al. |
| 2020/0390279 | A1 | 12/2020 | O'Shaughnessy et al. |
| 2020/0391779 | A1 | 12/2020 | Patton et al. |
| 2021/0045579 | A1 | 2/2021 | O'Shaughnessy et al. |
| 2021/0353099 | A1 | 11/2021 | O'Shaughnessy et al. |
| 2022/0355844 | A1 | 11/2022 | Patton et al. |
| 2023/0087213 | A1 | 3/2023 | O'Shaughnessy et al. |

FOREIGN PATENT DOCUMENTS

| | | |
|---|---|---|
| CN | 202807780 | 3/2013 |
| CN | 104234616 | 12/2014 |
| CN | 204618011 | 9/2015 |
| CN | 205632566 | 10/2016 |
| CN | 107198467 | 9/2017 |
| CN | 305874918 | 6/2020 |
| CN | 305874919 | 6/2020 |
| CN | 305874920 | 6/2020 |
| CN | 211685163 | 10/2020 |
| CN | 215361401 | 12/2021 |
| CN | 215457418 | 1/2022 |
| CN | 215457419 | 1/2022 |
| JP | 2006223643 | 8/2006 |
| KR | 200173343 | 4/2000 |
| KR | 20050102437 | 10/2005 |
| KR | 20130000879 | 2/2013 |
| TW | 309958 | 7/1997 |
| WO | 2004054415 | 7/2004 |
| WO | 2004072539 | 8/2004 |
| WO | 2015089551 | 6/2015 |
| WO | 2016149408 | 11/2016 |
| WO | 2017095746 | 6/2017 |
| WO | 2017160338 | 9/2017 |
| WO | 2018183373 | 10/2018 |
| WO | 2020005946 | 1/2020 |
| WO | 2020005969 | 1/2020 |
| WO | 2020005972 | 1/2020 |
| WO | 2020005976 | 1/2020 |
| WO | 2020005978 | 1/2020 |
| WO | 2020005981 | 1/2020 |

OTHER PUBLICATIONS

"Char-Broil Modular Outdoor Kitchen," Char Broil webpage Apr. 29, 2019, retrieved on Aug. 8, 2019, https://www.charbroil.com/grills/outdoor-kitchens/modular-outdoor-kitchen (4 pages).

"Danver's Post and Panel System," Danver webpage Jun. 1, 2018, retrieved on Aug. 8, 2019, https://danver.com/blog/post-and-panel-system/ (2 pages).

"Decision on Rejection," for CN Patent Application 201990000823.0, dated Jun. 17, 2022 (5 pages) with English summary.

"Ex Parte Quayle Action," for U.S. Appl. No. 29/695,966, mailed Dec. 11, 2020 (23 pages).

"Ex Parte Quayle Action," for U.S. Appl. No. 29/695,973 mailed Dec. 11, 2020 (23 pages).

"Ex Parte Quayle Action," for U.S. Appl. No. 29/695,976 mailed Dec. 11, 2020 (24 pages).

"Final Office Action," for U.S. Appl. No. 15/262,733 dated Sep. 5, 2019 (14 pages).

"Final Office Action," for U.S. Appl. No. 15/262,733 dated Oct. 18, 2018 (9 pages).

"Final Office Action," for U.S. Appl. No. 16/450,541 dated Feb. 5, 2020 (19 pages).

"First Correction Office Action," for Chinese Patent Application No. 201990000810.3 dated Sep. 8, 2021 (3 pages) with English Translation.

"First Office Action," for Chinese Patent Application No. 201990000823.0 dated Sep. 30, 2021 (5 pages) with English Summary.

"Fourth Office Action," for Chinese Patent Application No. 201610876505.3 dated Sep. 30, 2020 (11 pages) with English Summary.

"International Preliminary Report on Patentability," for PCT Application No. PCT/US2016/051319 dated Sep. 27, 2018 (11 pages).

"International Preliminary Report on Patentability," for PCT Application No. PCT/US2018/024628 dated Oct. 10, 2019 (13 pages).

"International Preliminary Report on Patentability," for PCT Application No. PCT/US2019/038993 dated Jan. 7, 2021 (9 pages).

"International Preliminary Report on Patentability," for PCT Application No. PCT/US2019/039024 dated Jan. 7, 2021 (10 pages).

"International Preliminary Report on Patentability," for PCT Application No. PCT/US2019/039027 dated Jan. 7, 2021 (9 pages).

"International Preliminary Report on Patentability," for PCT Application No. PCT/US2019/039034 dated Jan. 7, 2021 (8 pages).

"International Preliminary Report on Patentability," for PCT Application No. PCT/US2019/039039 dated Jan. 7, 2021 (10 pages).

"International Preliminary Report on Patentability," for PCT Application No. PCT/US2019/039042 dated Jan. 7, 2021 (9 pages).

"International Search Report and Written Opinion," for PCT Application No. PCT/US2016/051319 dated Dec. 8, 2016 (14 pages).

"International Search Report and Written Opinion," for PCT Application No. PCT/US2018/024628 dated Jul. 11, 2018 (16 pages).

(56) References Cited

OTHER PUBLICATIONS

"International Search Report and Written Opinion," for PCT Application No. PCT/US2019/038993 dated Oct. 15, 2019 (13 pages).
"International Search Report and Written Opinion," for PCT Application No. PCT/US2019/039024 dated Oct. 15, 2019 (14 pages).
"International Search Report and Written Opinion," for PCT Application No. PCT/US2019/039027 dated Oct. 15, 2019 (13 pages).
"International Search Report and Written Opinion," for PCT Application No. PCT/US2019/039034 dated Oct. 15, 2019 (12 pages).
"International Search Report and Written Opinion," for PCT Application No. PCT/US2019/039039 dated Oct. 16, 2019 (14 pages).
"International Search Report and Written Opinion," for PCT Application No. PCT/US2019/039042 dated Oct. 16, 2019 (13 pages).
"Modular Outdoor Kitchen," Char-Broil Medallion Series Outdoor Kitchen information retrieved from https://www.charbroil.com/grills/modular-outdoor-kitchen on Aug. 8, 2019 (4 pages).
"Non-Final Office Action," for U.S. Appl. No. 15/262,733 dated Feb. 23, 2018 (10 pages).
"Non-Final Office Action," for U.S. Appl. No. 15/262,733 dated Jan. 8, 2020 (18 pages).
"Non-Final Office Action," for U.S. Appl. No. 15/262,733 dated Mar. 7, 2019 (17 pages).
"Non-Final Office Action," for U.S. Appl. No. 15/937,666 dated Feb. 26, 2019 (16 pages).
"Non-Final Office Action," for U.S. Appl. No. 16/450,303 dated Oct. 24, 2019 (19 pages).
"Non-Final Office Action," for U.S. Appl. No. 16/450,356 dated Nov. 18, 2020 (31 pages).
"Non-Final Office Action," for U.S. Appl. No. 16/450,493 dated Nov. 2, 2020 (26 pages).
"Non-Final Office Action," for U.S. Appl. No. 16/450,510 dated Dec. 14, 2020 (32 pages).
"Non-Final Office Action," for U.S. Appl. No. 16/450,541 dated Oct. 1, 2019 (21 pages).
"Non-Final Office Action," for U.S. Appl. No. 16/908,023 dated Oct. 4, 2021 (30 pages).
"Non-Final Office Action," for U.S. Appl. No. 16/910,966 dated Jan. 14, 2022 (33 pages).
"Non-Final Office Action," for U.S. Appl. No. 17/008,331 dated Jan. 13, 2022 (29 pages).
"Notice of Allowance," for Design U.S. Appl. No. 29/695,969 dated Mar. 24, 2021 (18 pages).
"Notice of Allowance," for Design U.S. Appl. No. 29/695,976 dated Mar. 8, 2021 (16 pages).
"Notice of Allowance," for U.S. Appl. No. 15/937,666 dated Feb. 18, 2020 (14 pages).
"Notice of Allowance," for U.S. Appl. No. 15/937,666 dated Oct. 22, 2019 (12 pages).
"Notice of Allowance," for U.S. Appl. No. 16/450,303 dated Feb. 14, 2020 (13 pages).
"Notice of Allowance," for U.S. Appl. No. 16/450,356 dated Feb. 26, 2021 (17 pages).
"Notice of Allowance," for U.S. Appl. No. 16/450,388 dated Dec. 1, 2020 (27 pages).
"Notice of Allowance," for U.S. Appl. No. 16/450,493 dated Feb. 12, 2021 (21 pages).
"Notice of Allowance," for U.S. Appl. No. 16/450,510 dated Mar. 22, 2021 (18 pages).
"Notice of Allowance," for U.S. Appl. No. 16/450,541 dated May 14, 2020 (12 pages).
"Notice of Allowance," for U.S. Appl. No. 16/908,023 dated Jan. 31, 2022 (9 pages).
"Notice of Allowance," for U.S. Appl. No. 16/910,966 dated May 3, 2022 (9 pages).
"Notice of Allowance," for U.S. Appl. No. 17/008,331 dated May 3, 2022 (14 pages).
"Notice of Allowance," for U.S. Appl. No. 29/695,966 dated Mar. 1, 2021 (14 pages).
"Notice of Allowance," for U.S. Appl. No. 29/695,973 dated Mar. 3, 2021 (16 pages).
"Origami Carts and Racks," Origami webpage Apr. 20, 2016, retrieved on Dec. 9, 2019, via web.archive.org, https://origamirack.com (5 pages).
"Origami Kitchen Island Cart with Wheels," Description and Product Specs at least as early as Aug. 9, 2019 (5 pages).
"Response after Ex Parte Quayle Action," for U.S. Appl. No. 29/695,966, filed Feb. 9, 2021 (4 pages).
"Response after Ex Parte Quayle Action," for U.S. Appl. No. 29/695,973, filed Feb. 9, 2021 (4 pages).
"Response after Ex Parte Quayle Action," for U.S. Appl. No. 29/695,976, filed Feb. 9, 2021 (4 pages).
"Response to Final Office Action," for U.S. Appl. No. 15/262,733, filed Dec. 5, 2019 (11 pages).
"Response to Final Office Action," for U.S. Appl. No. 15/262,733, filed Dec. 13, 2018 (9 pages).
"Response to Final Office Action," for U.S. Appl. No. 16/450,541, filed May 5, 2020 (7 pages).
"Response to Non-Final Office Action," for U.S. Appl. No. 15/262,733 filed with the USPTO Jun. 25, 2018 (8 pages).
"Response to Non-Final Office Action," for U.S. Appl. No. 15/262,733, filed Aug. 7, 2019 (10 pages).
"Response to Non-Final Office Action," for U.S. Appl. No. 16/450,356, filed Feb. 17, 2021 (11 pages).
"Response to Non-Final Office Action," for U.S. Appl. No. 16/450,493, filed Feb. 2, 2021 (11 pages).
"Response to Non-Final Office Action," for U.S. Appl. No. 16/450,510, filedMar. 12, 2021 (11 pages).
"Response to Non-Final Office Action," for U.S. Appl. No. 16/450,541, filed Dec. 30, 2019 (16 pages).
"Response to Non-Final Office Action," for U.S. Appl. No. 16/908,023, filed Dec. 30, 2021 (9 pages).
"Response to Non-Final Office Action," for U.S. Appl. No. 16/910,966, filed Apr. 14, 2022 (11 pages).
"Response to Non-Final Office Action," for U.S. Appl. No. 17/008,331, filed Apr. 13, 2022 (10 pages).
"Second Office Action," for Chinese Patent Application No. 201610876505.3 dated Aug. 29, 2019 (4 pages) with English Translation.
"Second Office Action," for Chinese Patent Application No. 201990000823.0 dated Feb. 8, 2022 (4 pages) with English Summary.
"Sunco Outdoor Kitchen," Mar. 16, 2018 URL <https://www.sunco.com.au/shop/bbqs/sc100-xspec-four-burner-outdoor-kitchen/> (3 pages).
"Traeger Wood Pellet Grills," Product Listing found on www.traegergrills.com at least as early as Aug. 9, 2019 (4 pages).
"Traeger Wood Pellet Grills," Traeger Grills webpage Apr. 7, 2006, retrieved on Dec. 9, 2019, via web.archive.org, https://www.traegergrills.com (2 pages).
"TYTUS Charcoal Grey Stainless Steel 4 Burner Free Standing Grill," first available 2020, TytusGrills.com, [online], [site visited Nov. 27, 2020], Available from internet URL: https://tytusgrills.com/collections/grills/products/tytus-charcoal-grey-stainless-steel-4- burner-free-standing-grill (Year: 2020), 5 pages.
"TYTUS Grills," first available 2020, TytusGrills.com, [online], [site visited Dec. 1, 2020], Available from internet URL: https://tytusgrills.com/collections/grills (Year: 2020), 3 pages.
"TYTUS TI404MGGLP Spec Sheet," first available 2020, AppliancesConnection.com, [online], [site visited Nov. 27, 2020], Available from internet URL: https://static.appliancesconnection.com/attachments/D5f524932e12f6.pdf (Year: 2020), 2 pages.
"TYTUS TI400MWLP Spec Sheet," first available 2020, SamsClub.com, [online], [site visited Nov. 27, 2020], Available from internet URL: https://content.syndigo.com/asset/9f341 0f8-d6c3-48c1-a02c-f5bdbb9f989b/original.pdf (Year: 2020), 2 pages.
"TYTUS TI400SSBLP341 Spec Sheet," first available 2020, AppliancesConnection.com, [online], [site visited Nov. 27, 2020], Available from internet URL: https://static.appliancesconnection.com/attachments/D5f524e4ae6c38.pdf (Year: 2020), 2 pages.
"TYTUS User Manual 4-Burner Gas Grill and 4-Burner Island Gas Grill with Side Cabinets," first available 2020, TytusGrills.com, [online], [site visited Dec. 1, 2020], Available from internet URL: https://tytusgrills.com/pages/manualsanddocuments (Year: 2020), 60 pages).

(56) References Cited

OTHER PUBLICATIONS

Colon, Linda M. "Danver's Post and Panel System is a Hit with Architects, Builders, Developers & Designers," Danver Outdoor Kitchens Jun. 1, 2018 (2 pages).

Morgan, Grant "Nationwide Marketing Group Announces Its Partnership with TYTUS Grills," first available online Oct. 9, 2019, TytusGrills.com, [online], [site visited Nov. 27, 2020], available from internet URL: https://www.twice.com/retailing/nationwide-marketing-group-announces-its-partnership-with-tytus-grills (year: 2019).

"Notice of Allowance," for U.S. Appl. No. 17/752,428 dated Jan. 18, 2023 (27 pages).

\* cited by examiner

GRILL ASSEMBLY WITH FOLDABLE CART

CLAIM OF PRIORITY

This application is a continuation of U.S. patent application Ser. No. 17/008,331, filed Aug. 31, 2020, which is a continuation of U.S. patent application Ser. No. 16/450,541, filed Jun. 24, 2019, which claims the benefit of U.S. Provisional Application No. 62/690,700, filed Jun. 27, 2018, the content of which is herein incorporated by reference in its entirety.

REFERENCE TO RELATED APPLICATIONS

The following five nonprovisional applications also claim priority to U.S. Provisional Application No. 62/690,700, are co-owned, and are filed on the event date herewith: U.S. application Ser. No. 16/450,303, titled, "Grill and Side Cart Attachment Systems and Methods,"; U.S. application Ser. No. 16/450,356, titled, "Securing of Panels to Grill System,"; U.S. application Ser. No. 16/450,388, titled, "Grill System with Decorative Panels,"; U.S. application Ser. No. 16/450,493, titled, "Gas Guard in Grill Cart,"; U.S. application Ser. No. 16/450,510, titled, "Side Cart Locking Mechanism,"; the contents of which for each application are herein incorporated by reference in their entirety.

The following four design applications are co-owned and are filed on the event date herewith: U.S. Design Application No. 29/695,966, titled, "Grill System,"; U.S. Design Application No. 29/695,969, titled, "Grill Assembly,"; U.S. Design Application No. 29/695,973, titled, "Grill Cart,"; U.S. Design Application No. 29/695,976, titled, "Side Assembly,"; the contents of which for each application are herein incorporated by reference in their entirety.

FIELD

The present application relates to grills and outdoor cooking systems. More specifically, the present application relates to a grill assembly with a foldable cart.

BACKGROUND

Grilling is a cooking style that is especially popular in the United States. Grills are frequently not particularly portable or easy to set up. In many cases, grills are difficult to assemble due to numerous steps requiring the user to construct a frame with numerous components.

Attempts have been made to design grills that are easy to assemble after unloading from shipping containers. However, in many past systems, grill systems include, a large number of pieces, require numerous steps to assemble, and some assembly steps require tools.

Some past systems mount a firebox on a foldable stand. However, the foldable stands can require complex set-up steps and, even in the folded configuration, some of the foldable stands take-up significant space.

Permanent outdoor grill installations are increasingly popular, and allow consumers to choose many finishes and options to create an attractive and functional outdoor kitchen environment. These installations are very expensive, and lack the flexibility of a moveable grill system.

SUMMARY

In an embodiment, a grill is provided. The grill can include a grill cart and a burner box. The grill cart configured to be transitioned between an upright state and a folded state. The burner box configured to be detachably coupled to the grill cart in the upright state. The grill cart includes: a base; a front frame coupled to a first side of the base in the upright state and the folded state; a back frame coupled to a second side of the base in the upright state and the folded state; a first side frame coupled to a third side of the base in the upright state and the folded state; a second side frame coupled to a fourth side of the base in the upright state and the folded state. The coupling between the first side frame and the base is located in a first plane that is substantially parallel with a plane defined by a bottom plate of the base, and the coupling between the second side frame and the bottom plate of the base is located in a second plane that is substantially parallel with the plane defined by the bottom plate. The first plane is located a first distance away from the plane defined by the bottom plate and the second plane is located a second distance away from the plane defined by the bottom plate. The first distance is not equivalent to the second distance.

In an embodiment, in the upright state, the front frame, the back frame, the first side frame, and the second side frame are substantially perpendicular to the base.

In an embodiment, in the folded state, the first side frame overlaps the second side frame.

In an embodiment, in the folded state, the front frame overlaps the back frame.

In an embodiment, in the folded stat the front frame, the back frame, the first side frame, and the second side frame are substantially parallel with the base, and at least one of the first side frame and the second side frame are disposed between the front frame and the back frame.

In an embodiment, in a first outer side of the grill is defined by a first side portion of the base and a portion of the first side frame and a second outer side of the grill is defined by a second side portion of the base and a portion of the second side frame.

In an embodiment, the grill in the folded state has a volume of no more than 42,000 inches$^3$.

In an embodiment, the burner box includes: a first projection extending from the burner box; and a second projection extending from the burner box. In the folded state, the grill is configured such that the first projection is disposed in a first aperture defined by the base and the second projection is disposed in a second aperture defined by the base; wherein in the upright state the grill is configured such that the first projection is disposed in a third aperture defined by the first side frame and the second projection is disposed in a fourth aperture defined by the second side frame.

In an embodiment, a grill is provided. The grill can include a grill cart and a burner box. The grill cart can be configured to be transitioned between an upright state and a folded state. The burner box can be detachably coupled to the grill cart in both the upright state and the folded state. The grill cart includes: a base; a front frame rotatably coupled to a first side of the base; a back frame rotatably coupled to a second side of the base; a first side frame rotatably coupled to a third side of the base; and a second side frame rotatably coupled to a fourth side of the base.

In an embodiment, the burner box includes: a first projection extending from the burner box; and a second projection extending from the burner box. In the folded state, the grill is configured such that the first projection is disposed in a first aperture defined by the base and the second projection is disposed in a second aperture defined by the base. In the upright state, the grill is configured such that the first projection is disposed in a third aperture defined by the first side frame and the second projection is disposed in a fourth aperture defined by the second side frame.

In an embodiment, the first aperture and the fourth aperture are located on the same side of the grill cart, and the second aperture and the third aperture are located on the same side of the grill cart.

In an embodiment, the back frame includes a first portion coupled to a second portion. The first portion is coplanar with the second portion in the upright state. The first portion is coupled to the back portion via a piano hinge, a butt joint, or a telescope arrangement.

In an embodiment, a method of assembling a grill is provided. The method can include transitioning the grill cart from the folded state to an upright state, which can include rotating a front frame of the grill cart from a first position where the front frame is substantially parallel to a base of the grill cart to a second position where the front frame is substantially perpendicular to the base. The front frame is rotatably coupled to the base. The method can further include aligning a burner box with the grill cart in the upright state; and coupling the burner box to the grill cart in the upright state.

In an embodiment, the method can further include: uncoupling the burner box from the grill cart while the grill cart is in the folded state; and separating the burner box from the grill cart while the grill cart is in the folded state.

In an embodiment, separating the burner box from the cart in the folded state includes removing a first projection of the burner box and a second projection of the burner box from a first aperture in a base of the grill cart and a second aperture in the base of the grill cart.

In an embodiment, coupling the burner box to the grill cart in the upright state includes inserting the first projection into a third aperture in the grill cart and inserting the second projection into a fourth aperture in the grill cart.

In an embodiment, the third aperture is defined by a portion of a first side frame, and the fourth aperture is defined by a portion of a second side frame.

In an embodiment, the method can further include rotating the grill cart 180 degrees relative to the burner box after separating the burner box from the grill cart.

In an embodiment, the front frame includes at least one door.

In an embodiment, transitioning the grill cart from the folded state to the upright state further includes moving a first side frame of the grill cart from a first position where the first side frame is substantially parallel to the base of the grill cart to a second position where the first side frame is substantially perpendicular to the base, and moving a second side frame of the grill cart from a first position where the second side frame is substantially parallel to the base to a second position where the second side frame is substantially perpendicular to the base.

In an embodiment, transitioning the grill cart from the folded state to the upright state further includes moving a back frame of the grill cart from a first position where the back frame is substantially parallel to the base to a second position where the back frame is substantially perpendicular to the base.

In an embodiment, the method can further include moving a second back frame to a position in which the second back frame is coplanar with the back frame.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Described below and shown in the figures are various embodiments of components that can be included in a grill system. The grill system can include a grill assembly and one or more side assemblies. The grill assembly can include a burner box, which can be used to cook foods, such as meats and vegetables. Each side assembly can include a functional top cap to provide additional functionality to the grill system.

The grill and side assemblies can be shipped or transported in a folded configuration. In the folded configuration, the grill and side assemblies can have a smaller volume compared to the upright configurations. The smaller volume can reduce the cost of storing and transporting the components.

The grill and side assemblies described herein can be easily assembled. In many cases, the grill and side assemblies can be assembled by a single user or only two users. In many examples, the grill and side assemblies can be assembled without the use of tools. In many examples, the grill and side assemblies can be assembled quickly, such as in less than three minutes for each component. In many examples, the grill systems described herein can provide a highly customizable, an easily assembled, and an easily installed outdoor kitchen environment.

Grill System with Grill Assembly and Side Assemblies

Figure 1:
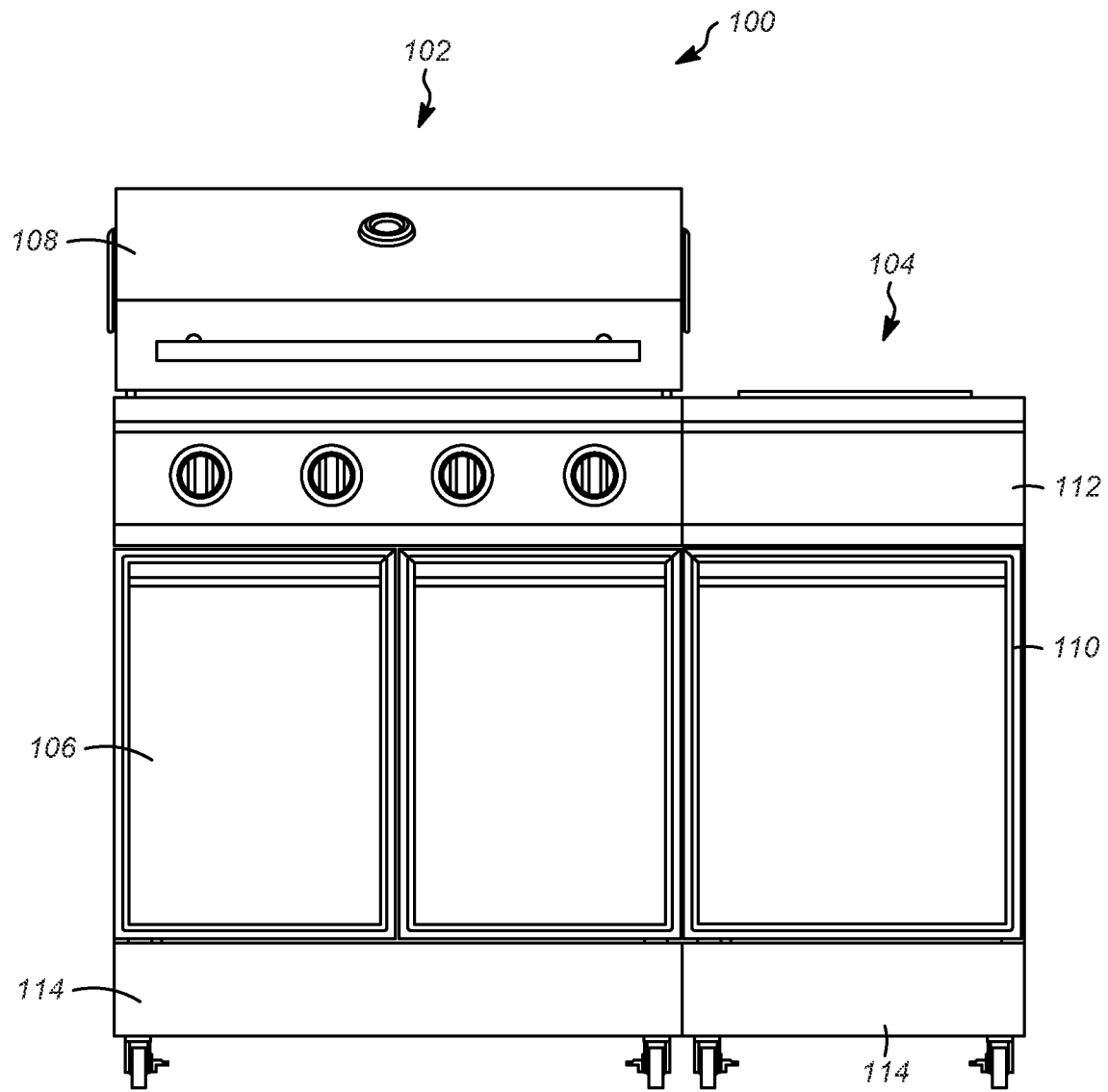
FIG. 1 is a front view of a grill system in accordance with various embodiments herein.

The figures show various views and embodiments of grill systems and components. FIG. 1 shows a grill system 100 including a grill assembly 102 and a side assembly 104. The grill assembly 102 can include a grill cart 106 and a burner box 108 (also referred to as a "firebox") coupled to a top portion of the grill cart 106. The side assembly 104 can include a side cart 110 and a top cap 112. The top cap 112 can be coupled to a top portion of the side cart 110.

Figure 2:
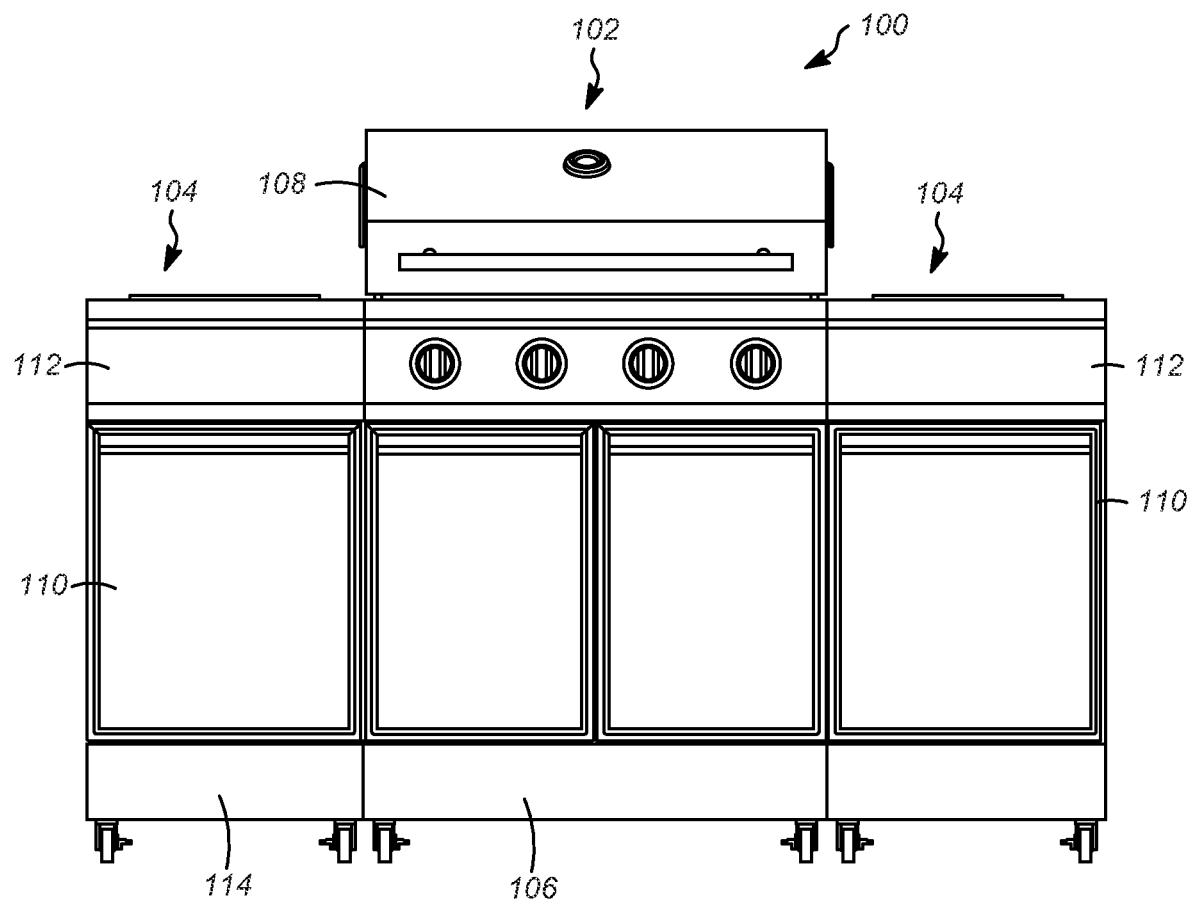
FIG. 2 is a front view of a grill system in accordance with various embodiments herein.
Figure 3:
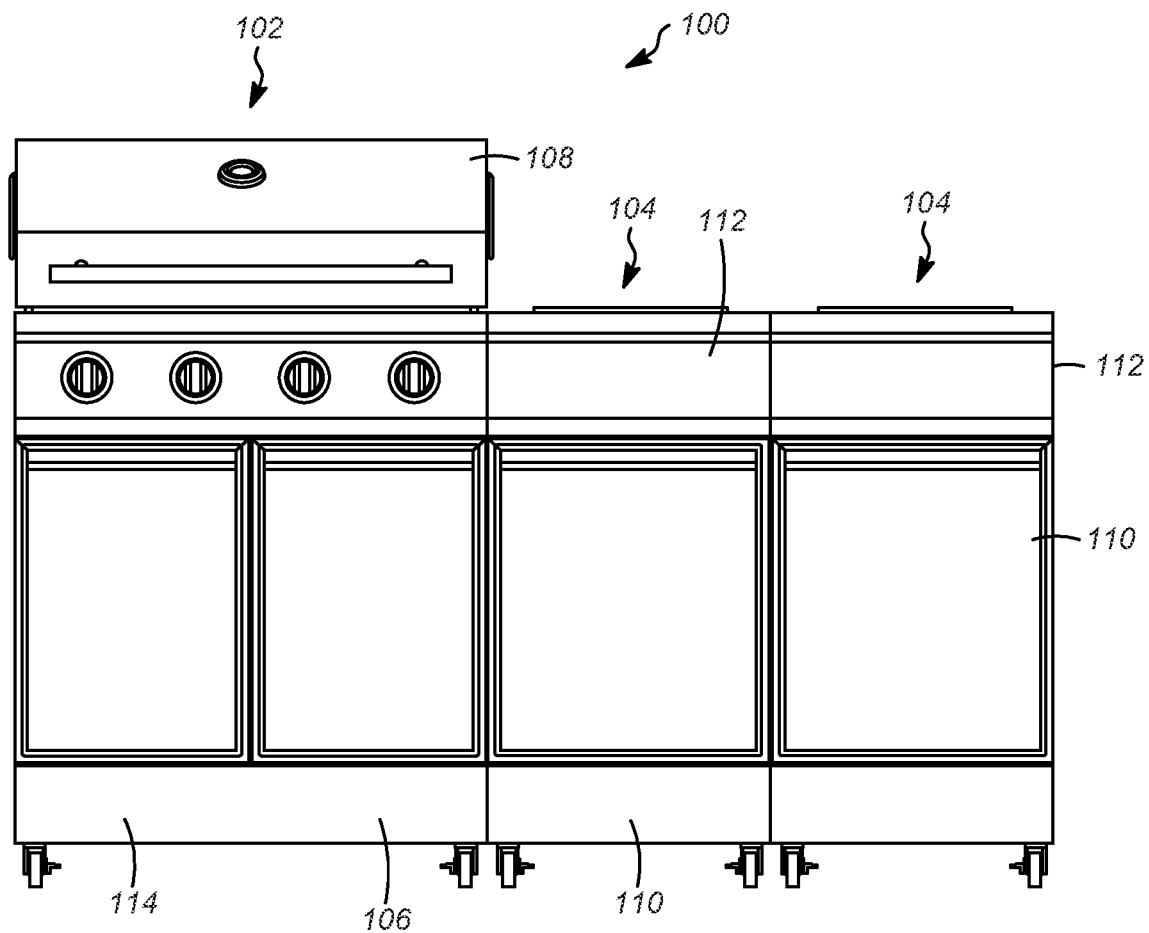
FIG. 3 is a front view of a grill system in accordance with various embodiments herein.

FIG. 2 shows a front view of a grill system 100 in accordance with various embodiments herein. In some embodiments, the grill system 100 can include a grill assembly 102, and two or more side assemblies 104. Each of the side assemblies 104 can include a side cart 110 and a top cap 112. In some embodiments, the side assemblies 104 can be disposed on opposite sides of the grill assembly 102, such as shown in FIG. 2. In some embodiments, the side assemblies 104 can be disposed on the same side of the grill assembly 102, such as shown in FIG. 3. In other embodiments, the grill system 100 can include additional side assemblies 104, such as three, four, five, six, or more side assemblies 104.

In some embodiments, all of the side assemblies 104 can be located on one side of the grill assembly 102, such as shown in FIG. 3. In some embodiments, side assemblies 104 can be located on both sides of the grill assembly 102, such as shown in FIG. 2. In some embodiments, an equal number of side assemblies 104 can be located on either side of the grill assembly 102. In some embodiments, the number of side assemblies 104 on one side of the grill assembly 102 can be greater than or less than the number of side assemblies 104 on the other side of the grill assembly 102.

In various embodiments, the burner box 108 can include a first connection structure, and the top cap 112 can include a second connection structure. The first connection structure can be configured to mate with the second connection structure to couple the grill assembly 102 to the side assembly 104.

In some embodiments, the grill assembly 102 can include a toe kick panel 114. In some embodiments, the side assembly 104 can include a toe kick panel 114. In some embodiments, the toe kick panel 114 of the grill assembly 102 can include a connection feature and the toe kick panel 114 of the side assembly 104 can include a connection feature, such as two portions of a latch mechanism. The connection features of the two toe kick panels 114 can be coupled together to couple the grill assembly 102 with the side assembly 104. In some embodiments, the connection features of the toe kick panels 114 can be like other connection mechanisms described herein, such as the connection mechanism for coupling the burner box 108 to the grill cart 106.

In some embodiments, the grill cart 106 can include one or more panels on the sides of the grill cart 106. In some embodiments, the grill cart 106 can include a toe kick panel 114. In some embodiments, the toe kick panel 114 and the panel can include a common decorative design to provide a cohesive appearance.

Grill Assembly

Figure 4:
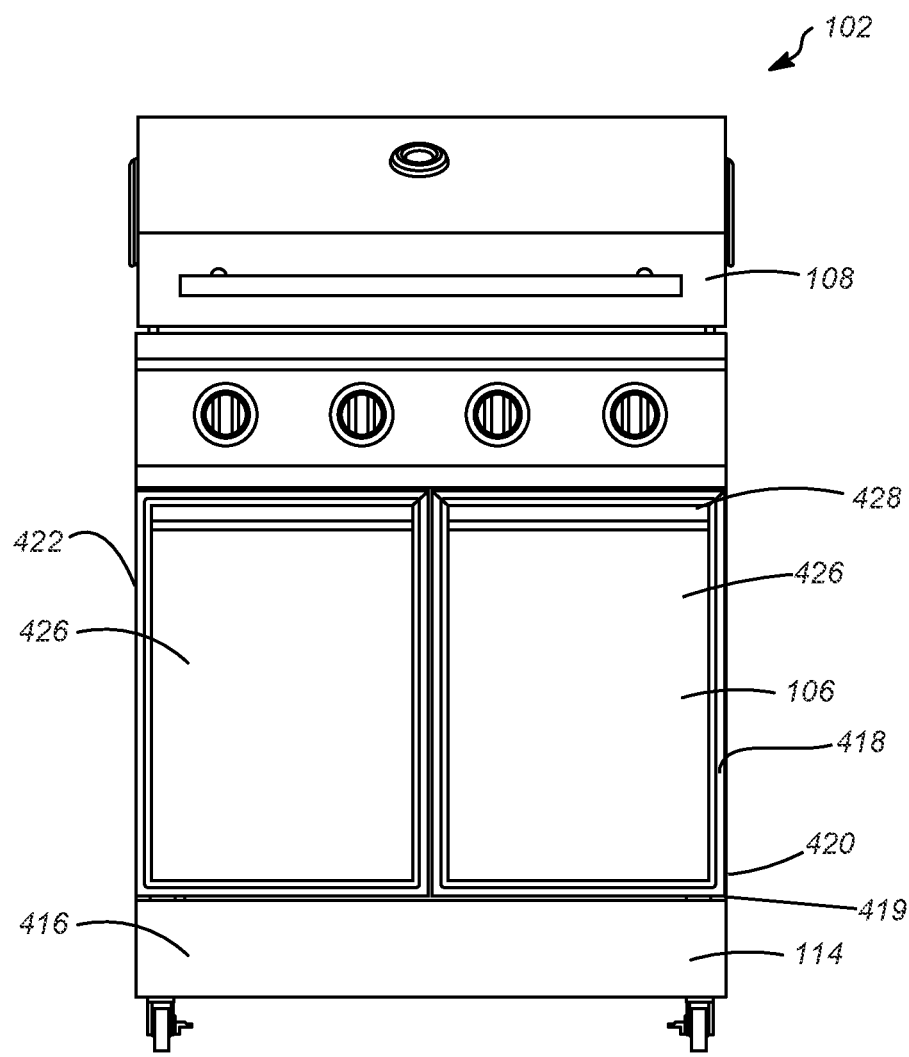
FIG. 4 is a front view of a grill assembly in accordance with various embodiments herein.
Figure 5:
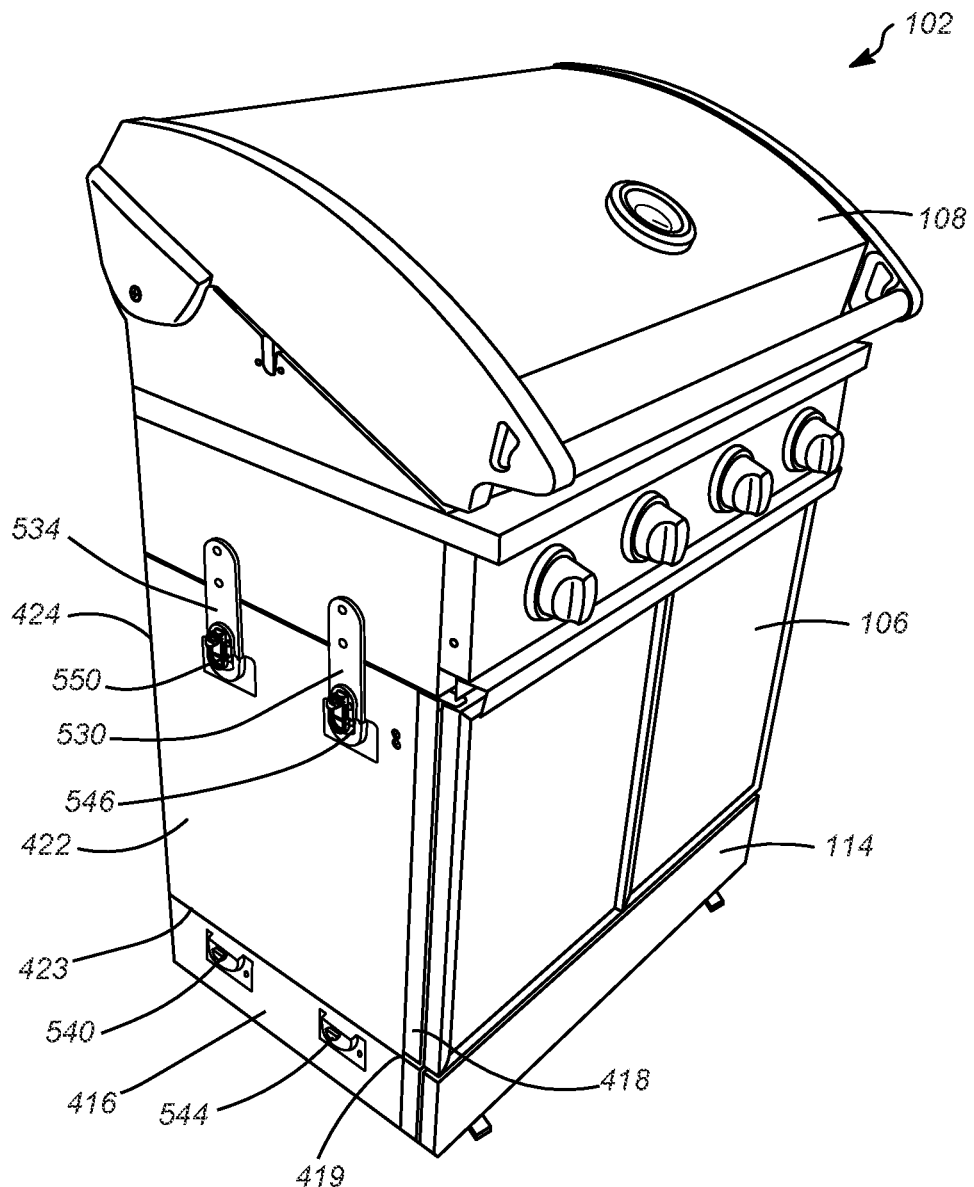
FIG. 5 is a perspective view of a grill assembly with a grill cart in an upright state in accordance with various embodiments herein.

In reference now to FIGS. 4 and 5, a front view of a grill assembly 102 with the grill cart 106 in the upright state is shown in FIG. 4 and a perspective view of the grill assembly 102 with the grill cart 106 in the upright state is shown in FIG. 5 in accordance with various embodiments herein. The grill assembly 102 can include a burner box 108 coupled to a top portion of a grill cart 106.

In various embodiments, the grill cart 106 can include a base portion 416, a front frame 418, a first side frame 420, a second side frame 422 and a back frame 424. In some embodiments, a frame can be a panel. In some embodiments a frame can include a panel. In some embodiments, a frame can be configured to receive a panel. In some embodiments, a frame can be rectangular or include four sides. In some embodiments, a frame can define an opening or aperture, such as to receive a panel. In some embodiments, a frame can have an open side, such as to receive a panel. In some embodiments, a frame can provide a base structure for other components to be coupled to, such as a door or panel.

In some embodiments, one or more of the frames 418, 420, 422, 424 of the grill cart 106 have a frame bottom edge attached the base portion 416 and a frame top edge. In some embodiments, one or more of the frames 418, 420, 422, 424 have at least one embodiment that is a unitary piece as it extends from its bottom edge to its top edge. For example a perimeter frame or a panel can be unitary. In some embodiments, one or more of the frames 418, 420, 422, 424 does not fold or buckle between the top edge and the bottom edge. In various embodiments, one or more of the frames 418, 420, 422, 424 can be rigid, such that a portion of the frame does not rotate, twist, bend or otherwise move relative to other portions of the frame.

In various embodiments, the grill cart 106 can include a front frame 418 coupled to a first side of the base portion 416 in the upright state and the folded state. In various embodiments, the grill cart 106 can include a first side frame 420 coupled to a second side of the base portion 416 in the upright state and the folded state. In various embodiments, the grill cart 106 can include a second side frame 422 coupled to a third side of the base portion 416 in the upright state and the folded state. In various embodiments, the grill cart 106 can include a back frame coupled to a fourth side of the base portion 416 in the upright state and the folded state.

Figure 10:
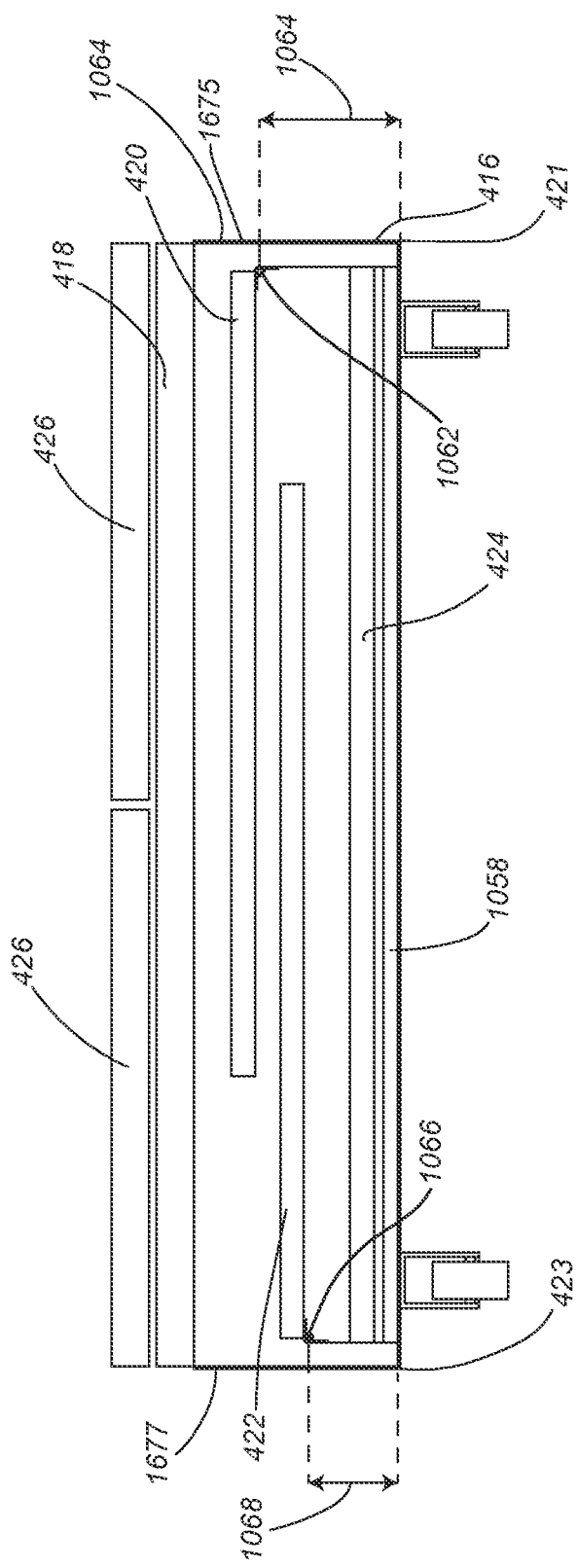
FIG. 10 is a cross-sectional view of the grill cart in a folded state of FIG. 9 in accordance with various embodiments herein.

The front frame 418 can be rotatably coupled to the base portion 416 along a first or front edge 419 of the base portion 416. The rotatable coupling can allow the front frame 418 to rotate relative to the base portion 416, such as from a folded position where the front frame 418 is substantially parallel with a bottom plate of the base portion 416 to an upright position where the front frame 418 is or substantially perpendicular to the bottom plate of the base portion 416. Similarly, the first side frame 420 can be rotatably coupled to a second edge 421 of the base portion 416, the second side frame 422 can be rotatably coupled to a third edge 423 of the base portion 416, and the back frame 424 can be rotatably coupled to a fourth or back edge 425 of the base portion 416. It should be understood that in some embodiments "coupled to an edge" can include being coupled along an edge, being coupled parallel or substantially parallel to an adjacent edge, or being coupled offset from an edge, such as shown in FIG. 10.

In some embodiments, the front frame 418 can include at least one door 426. In some embodiments, the front frame 418 can include two doors 426. In some embodiments, a door 426 can include a door handle 428, such as a horizontal recess. In some embodiments, the horizontal recess can be located at the top of the frame. In some embodiments, a door 426 can include a vertical recess for a door handle, such as a vertical recess that extends along a side of the door 426 opposite from the side of the door 426 that is coupled to the front frame 418.

In various embodiments, the burner box 108 can include one or more projections for connecting with the grill cart 106. In various embodiments, the grill cart 106 can define a plurality of apertures configured to receive the projections from the burner box 108. In some embodiments, the number of projections on the burner box 108 can be equal to the number of apertures defined by the grill cart 106. In some embodiments, the grill cart 106 can include one or more projections, and the burner box 108 can define one or more apertures configured to receive the projections from the grill cart 106.

In some embodiments, the number of apertures defined by the grill cart 106 can be greater than the number of projections on the burner box 108. In some embodiments, the number of apertures defined by the grill cart 106 can be at least twice as many than the number of projections on the burner box 108, such as two projections and four apertures, or four projections and eight apertures. In some embodiments, a portion of the apertures can be defined by the base portion 416 and the remaining portion of the apertures can be defined by a portion of the front frame 418, the first side frame 420, the second side frame 422, and the back frame 424. In some embodiments, half of the apertures are defined by the base portion 416 and half of the apertures are defined by the front frame 418, the first side frame 420, the second side frame 422, and the back frame 424. In some embodiments, half of the apertures can be defined by the base portion 416, a quarter of the apertures are defined by the first side frame 420, and a quarter of the apertures are defined by the second side frame 422.

Figure 6:
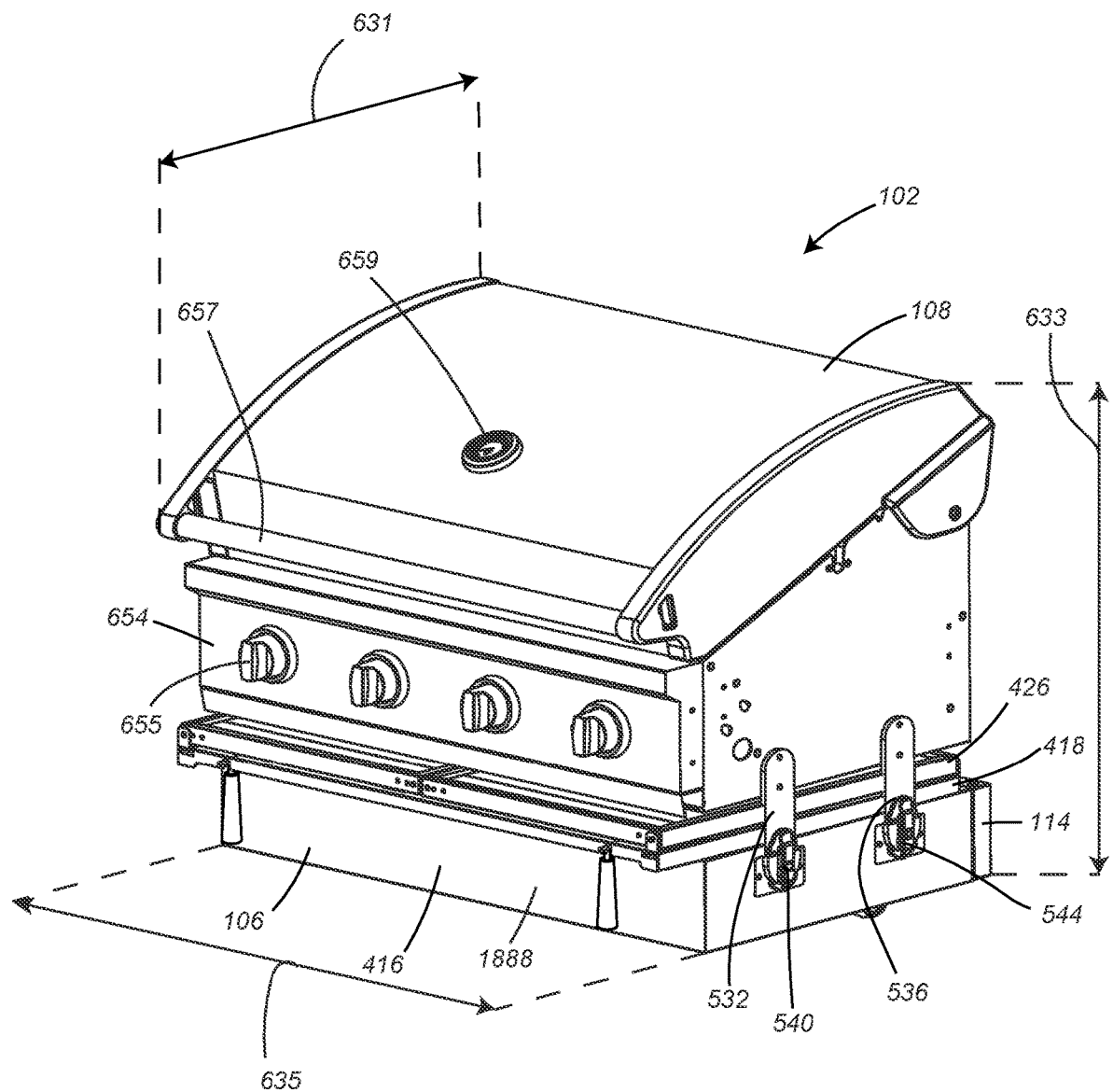
FIG. 6 is a perspective view of a grill assembly with a grill cart in a folded state in accordance with various embodiments herein.

In some embodiments, the burner box 108 can include four projections, such as first projection 530, a second projection 532, a third projection 534, and a fourth projection 536. The first projection 530 and the third projection 534 can be located on the same side of the burner box 108, such as shown in FIG. 5. Similarly, the second projection 532 and the fourth projection 536 can be located on the same side of the burner box 108 opposite from the side with the first projection 530 and the third projection 534, such as shown in FIG. 6.

In some embodiments, the grill cart 106 can define eight apertures, such as a first aperture 538, a second aperture 540, a third aperture 542, a fourth aperture 544, a fifth aperture 546, a sixth aperture 548, a seventh aperture 550, and an eighth aperture 552. In various embodiments, the first aperture 538, the second aperture 540, the third aperture 542, and the fourth aperture 544 can be defined by the base portion 416. In various embodiments, the fifth aperture 546, the sixth aperture 548, the seventh aperture 550, and the eighth aperture 552 can be defined by the first side frame 420 and the second side frame 422.

Figure 9:
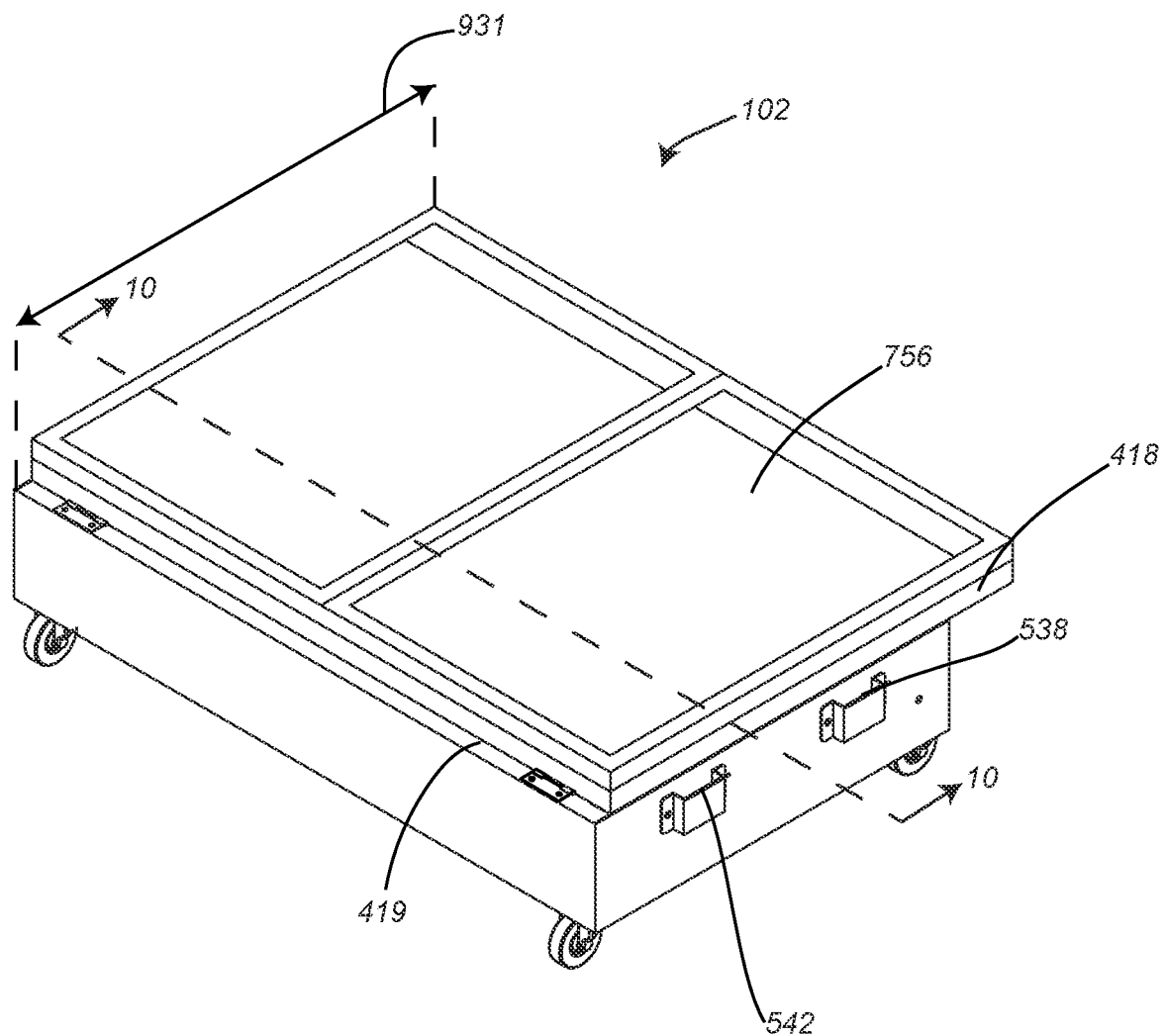
FIG. 9 is a perspective view of a grill cart in a folded state in accordance with various embodiments herein.
Figure 13:
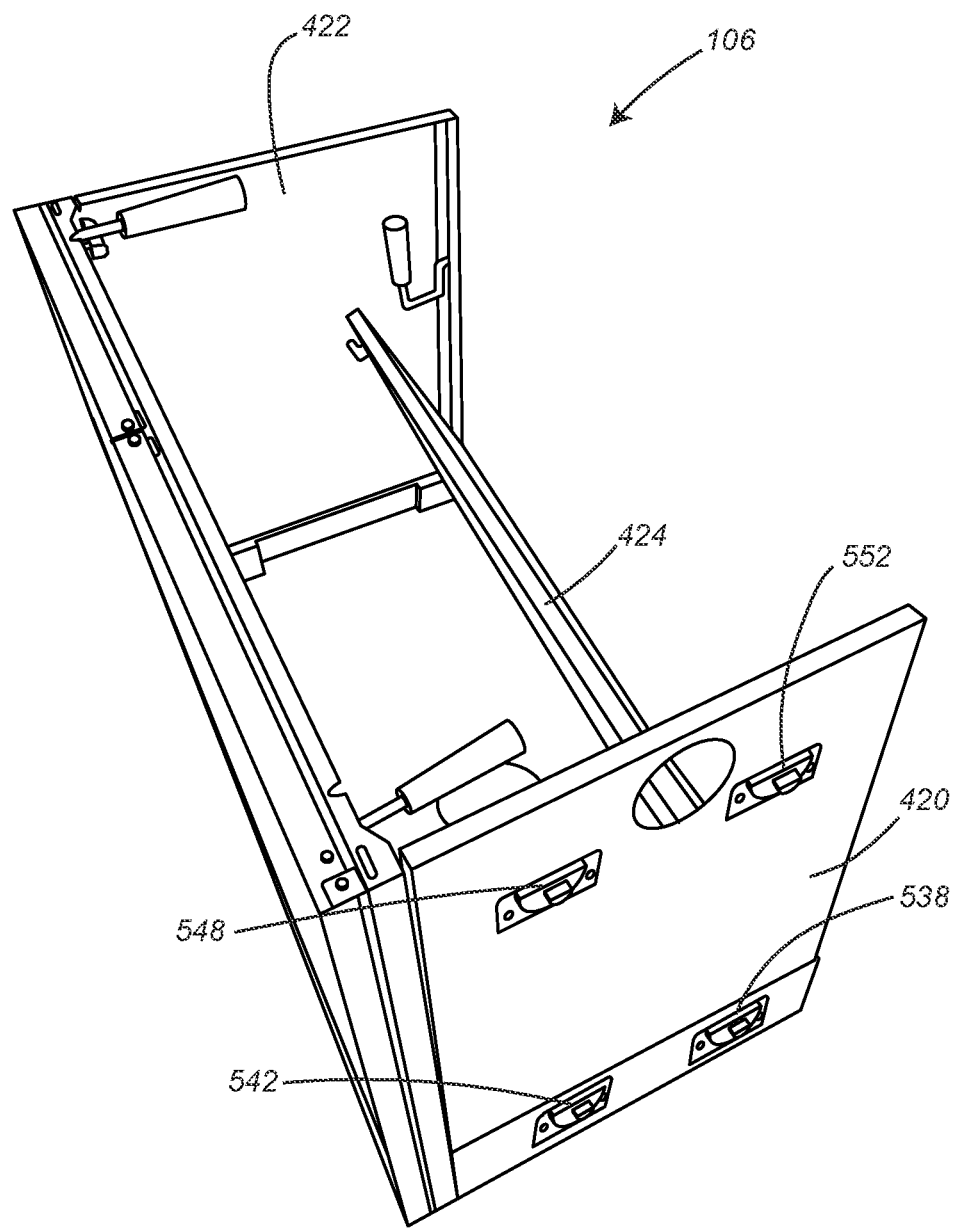
FIG. 13 is a perspective view of a grill cart with a back frame in a partially upright state in accordance with various embodiments herein.

In some embodiments, the first aperture 538 and the third aperture 542 can be located on the same side of the base portion 416, such as shown in FIG. 9. In some embodiments, the second aperture 540 and the fourth aperture 544 can be located on the same side of the base portion 416, such as shown in FIG. 5. In some embodiments, the fifth aperture 546 and the seventh aperture 550 can be located on the same side frame, such as shown in FIG. 5. In some embodiments, the sixth aperture 548 and the eighth aperture 552 can be located on the same side frame, such as shown in FIG. 13.

In some embodiments, the first projection 530 can be configured to be disposed at least partially within the first aperture 538 to couple the burner box 108 to the grill cart 106 in a folded state. Further, the second projection 532 can be disposed at least partially within the second aperture 540, the third projection 534 can be disposed at least partially within the third aperture 542, and the fourth projection 536 can be disposed at least partially within the fourth aperture 544.

In some embodiments, the first projection 530 can be configured to be disposed at least partially within the fifth aperture 546 to couple the burner box 108 to the grill cart 106 in the upright state. Further, the second projection 532 can be disposed at least partially within the sixth aperture 548, the third projection 534 can be disposed at least partially within the seventh aperture 550, and the fourth projection 536 can be disposed at least partially within the eighth aperture 552 to couple the burner box 108 to the grill cart 106 in the upright state.

Conversion from Folded to Upright State

Figure 22:
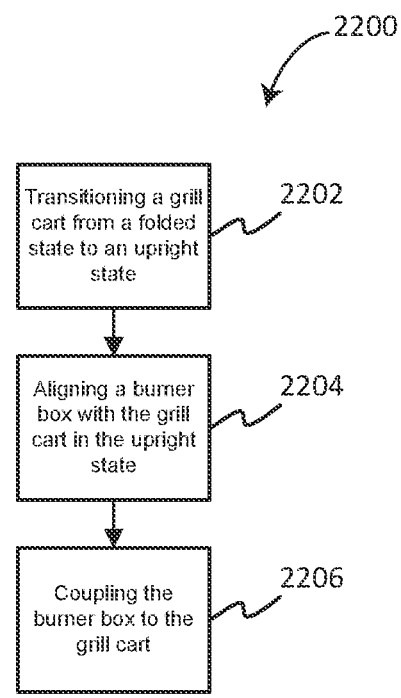
FIG. 22 is a flow chart depicting a method in accordance with various embodiments herein.
Figure 23:
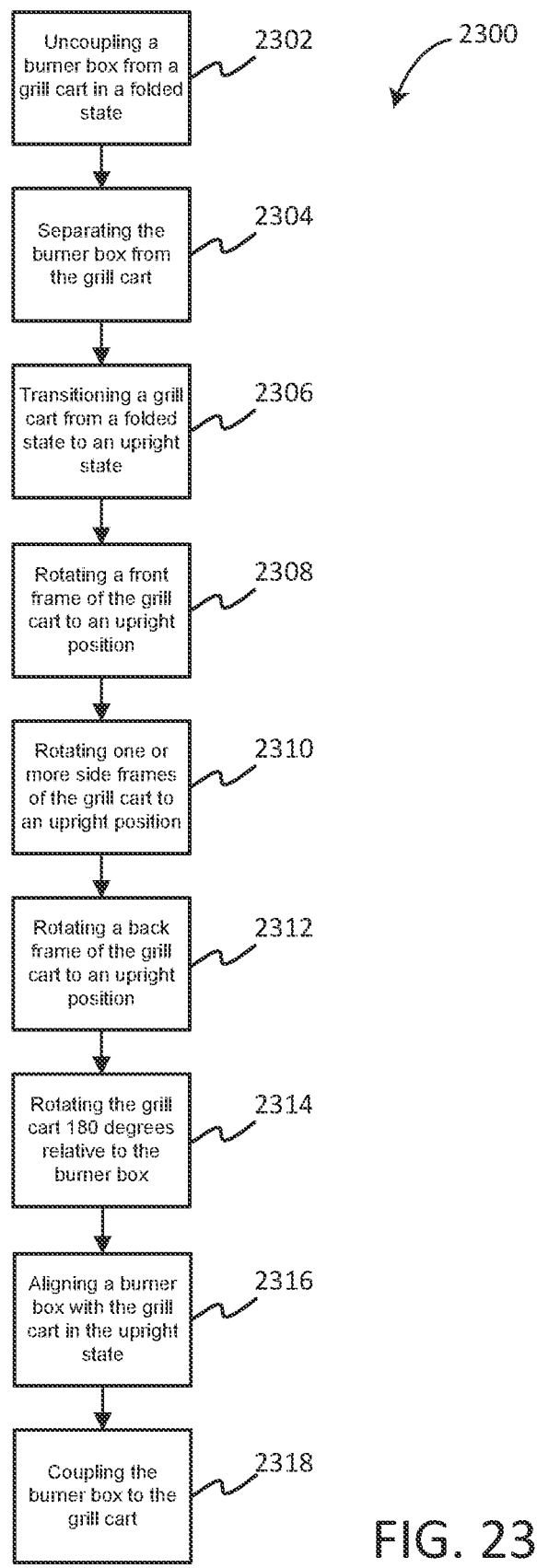
FIG. 23 is a flow chart depicting a method in accordance with various embodiments herein.

As mentioned above, the grill cart 106 can be configured to transition between a folded state and an upright state. FIGS. 6-18 show various steps of transitioning a grill assembly 102 from a folded state to an upright state. FIGS. 22 and 23 are flowcharts showing method steps involved in assembling the grill assembly from a folded state to an upright state, in some embodiments. In some embodiments, the steps shown in FIGS. 6-18, FIG. 22 and FIG. 23 can be reversed, such as to transition the grill cart to a folded state from an upright state. In various embodiments, the transition from a folded state to an upright state can be accomplished without the use of any tools. In various embodiments, the reverse transition from an upright state to a folded state can be accomplished without the use of any tools. In various embodiments, the transition from a folded state to an upright state can be accomplished in less than 5 or 10 minutes. In various embodiments, the reverse transition from an upright state to a folded state can be accomplished in less than 5 or 10 minutes. In various embodiments, the transition from a folded state to an upright state can be accomplished by one person. In various embodiments, the reverse transition from an upright state to a folded state can be accomplished by one person.

Figure 16:
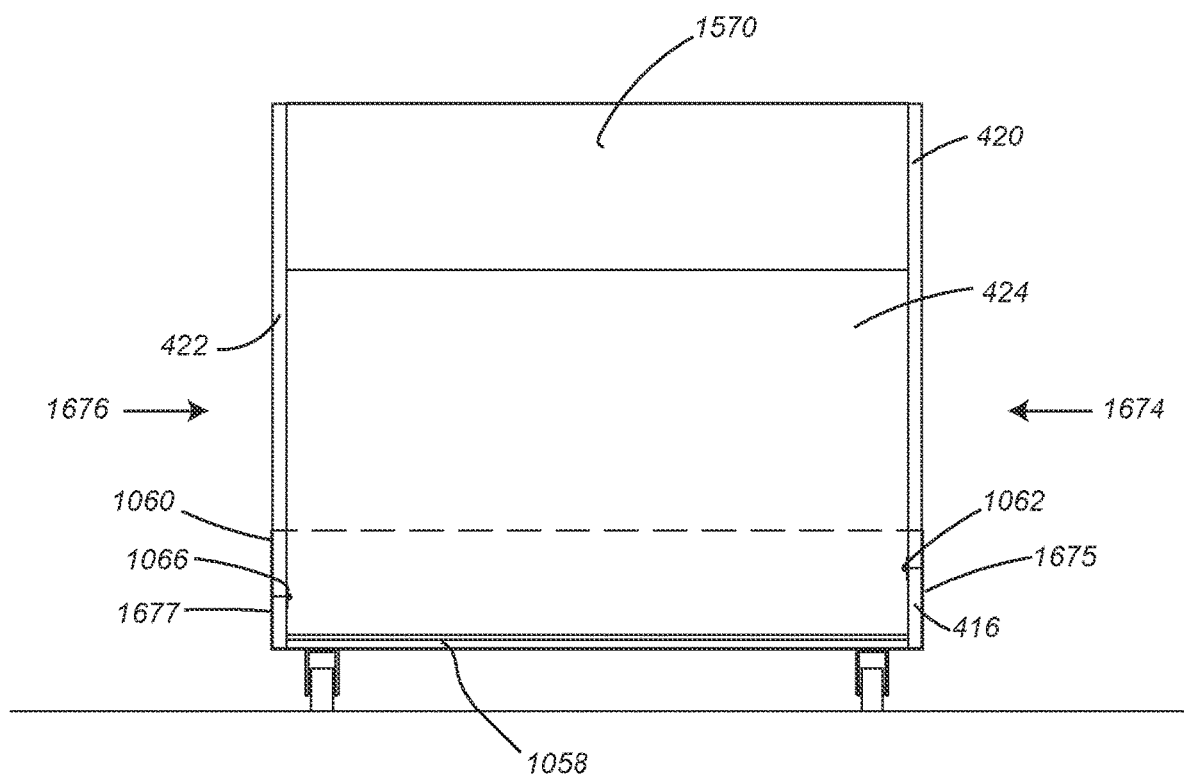
FIG. 16 is a cross-section view of the grill cart in an upright state in FIG. 15 in accordance with various embodiments herein.

In a folded state, a frame can be parallel or substantially parallel with the bottom plate 1058, such as shown in FIG. 6. In an upright state, a frame can be perpendicular or substantially perpendicular with the bottom plate 1058, such as shown in FIG. 16.

In various embodiments, the burner box 108 can be coupled to the grill cart 106 when the grill cart 106 is in the folded state, such as shown in FIG. 6. The burner box 108 can also be coupled to the grill cart 106 when the grill cart 106 is in the upright state, such as shown in FIGS. 1-4.

FIG. 6 is a perspective view of a grill assembly 102 in accordance with various embodiments herein. The grill assembly 102 can include a grill cart 106 and a burner box 108. In some embodiments, the burner box 108 can be configured to be detachably coupled to the grill cart 106 in both the upright state and the folded state. FIG. 6 shows an embodiment of a grill assembly 102 with the burner box 108 coupled to the grill cart 106 in the folded state. Coupling the burner box 108 to the grill cart 106 in the folded state can reduce the overall size of the grill assembly 102, such as to make transportation or storage of the grill assembly 102 easier.

Examples of dimensions of the grill assembly 102 and components of the grill assembly 102 in a folded state and an upright state will now be described with respect to FIGS. 6, 7, 9, 17 and 18. Now referring to FIG. 7, in various embodiments, the burner box 108 can have a height 755, without projections 530, 532, of at least 15 inches and not more than 25 inches, such as about 19 inches. In various embodiments, the burner box 108 can have a height 739 including the projections 530, 532 of at least 20 inches and not more than 30 inches, such as about 23½ inches. In some embodiments, the burner box 108 can have a width 757, without brackets 729, of at least 25 inches and not more than 40 inches, such as about 31 inches. In various embodiments, the burner box 108 can have a width 737 with the brackets 729 of at least 30 inches and not more than 48 inches, such as about 35 inches. The brackets 729 can be configured to attach the burner box to a side assembly. Now referring to FIG. 18, in various embodiments, the burner box 108 can have a depth 1833 of at least 20 inches and not more than 30 inches, such as about 24 inches.

Figure 7:
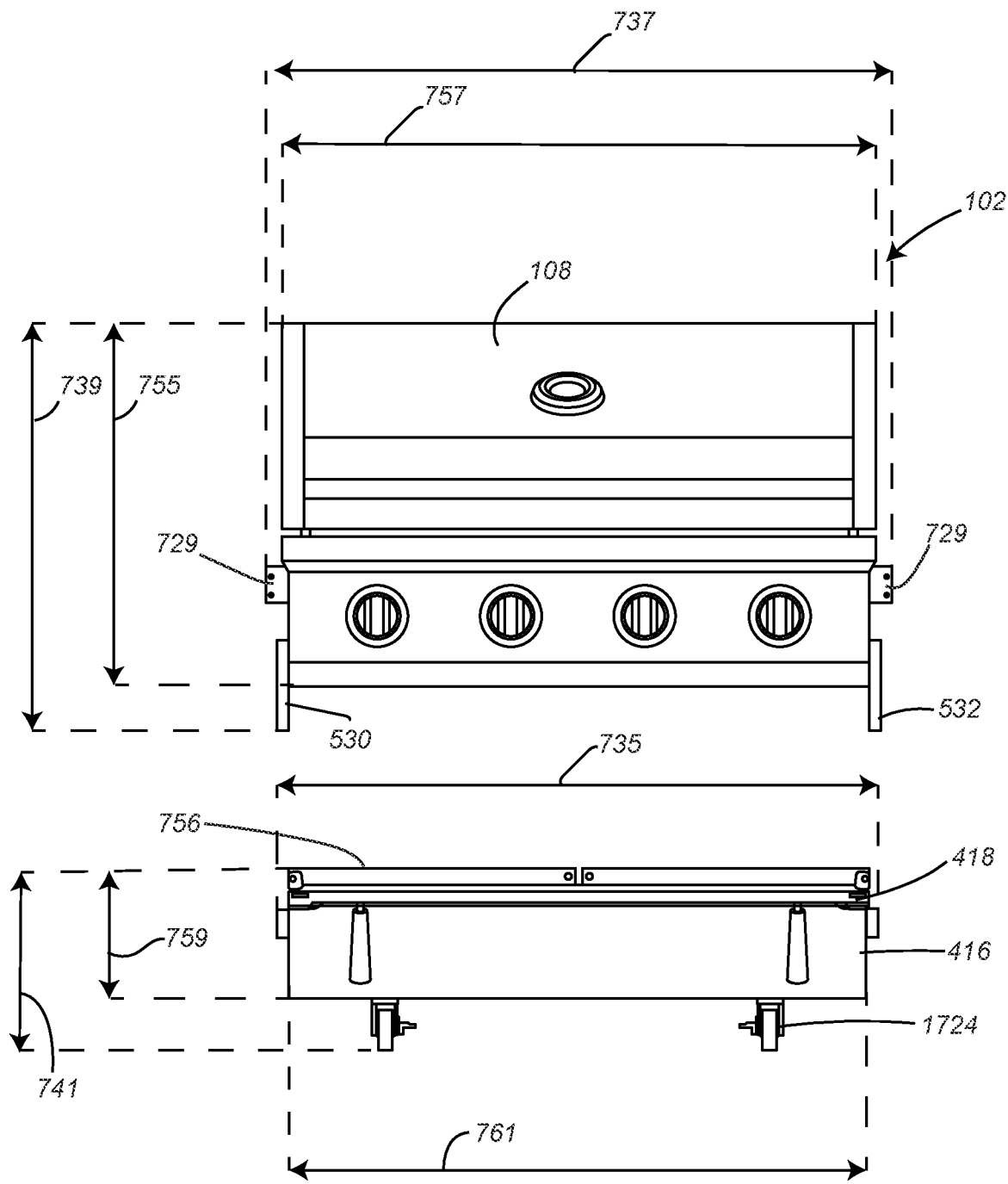
FIG. 7 is a perspective view of a grill assembly with a grill cart in a folded state in accordance with various embodiments herein.
Figure 8:
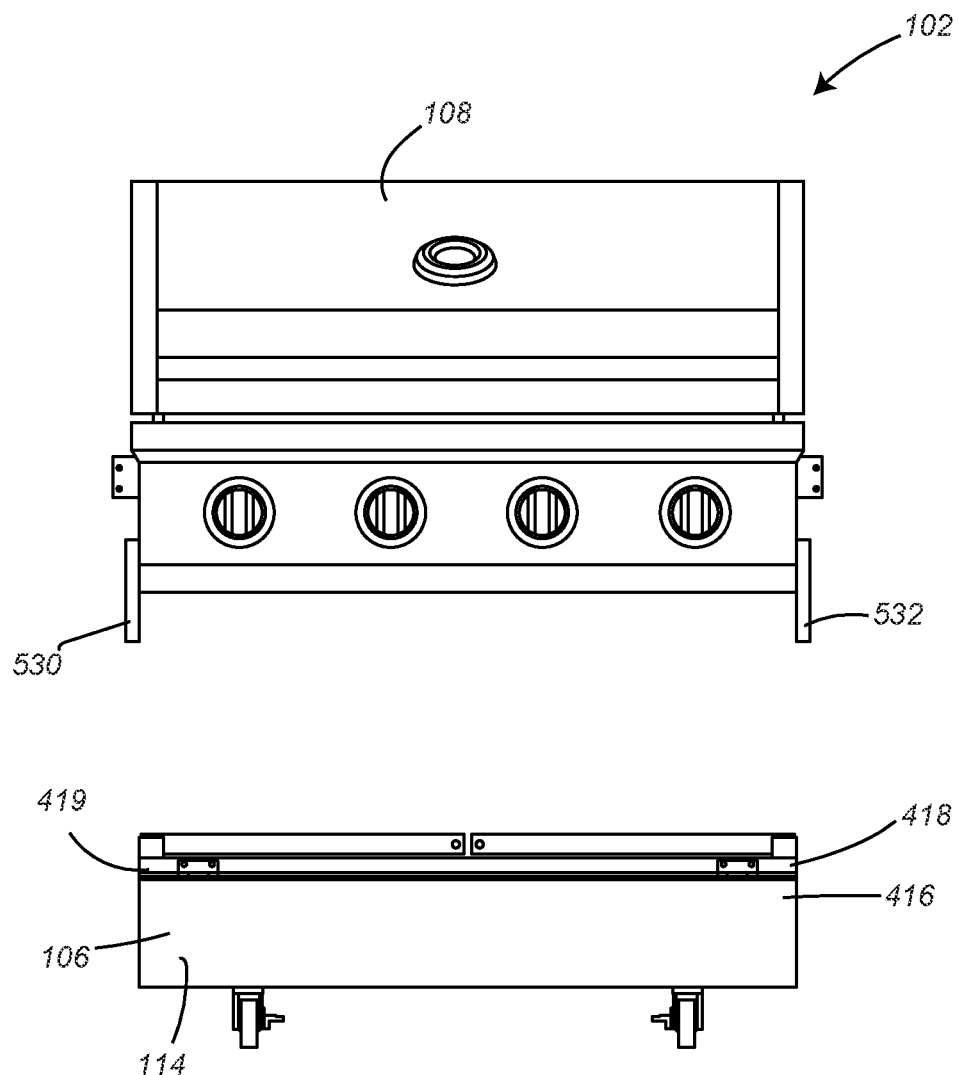
FIG. 8 is a perspective view of a grill assembly with a grill cart in a folded state in accordance with various embodiments herein.

Now referring to FIG. 7, in various embodiments, the grill cart 106, in the folded state, can have a height 759, not including the wheels 1724, of at least 5 inches and not more than 10 inches, such as about 7 inches. In various embodiments, the grill cart 106, in the folded state, can have a height 741 of at least 5 inches and not more than 15 inches, such as about 10 inches. In various embodiments, the grill cart 106, in the folded state, can have a width 761, not including the portions that define the apertures 538, 540, 542, 544, of at least 25 inches and not more than 35 inches, such as about 30 inches. In various embodiment, the grill cart 106, in the folded state, can have a width 735 including the portions that define the apertures 538, 540, 542, 544 of at least 25 inches and not more than 35 inches, such as about 31½ inches. Now referring to FIG. 9, in various embodiments, the grill cart 106, in the folded state, can have a depth 931 of at least 18 inches and not more than 28 inches, such as about 22½ inches.

Figure 17:
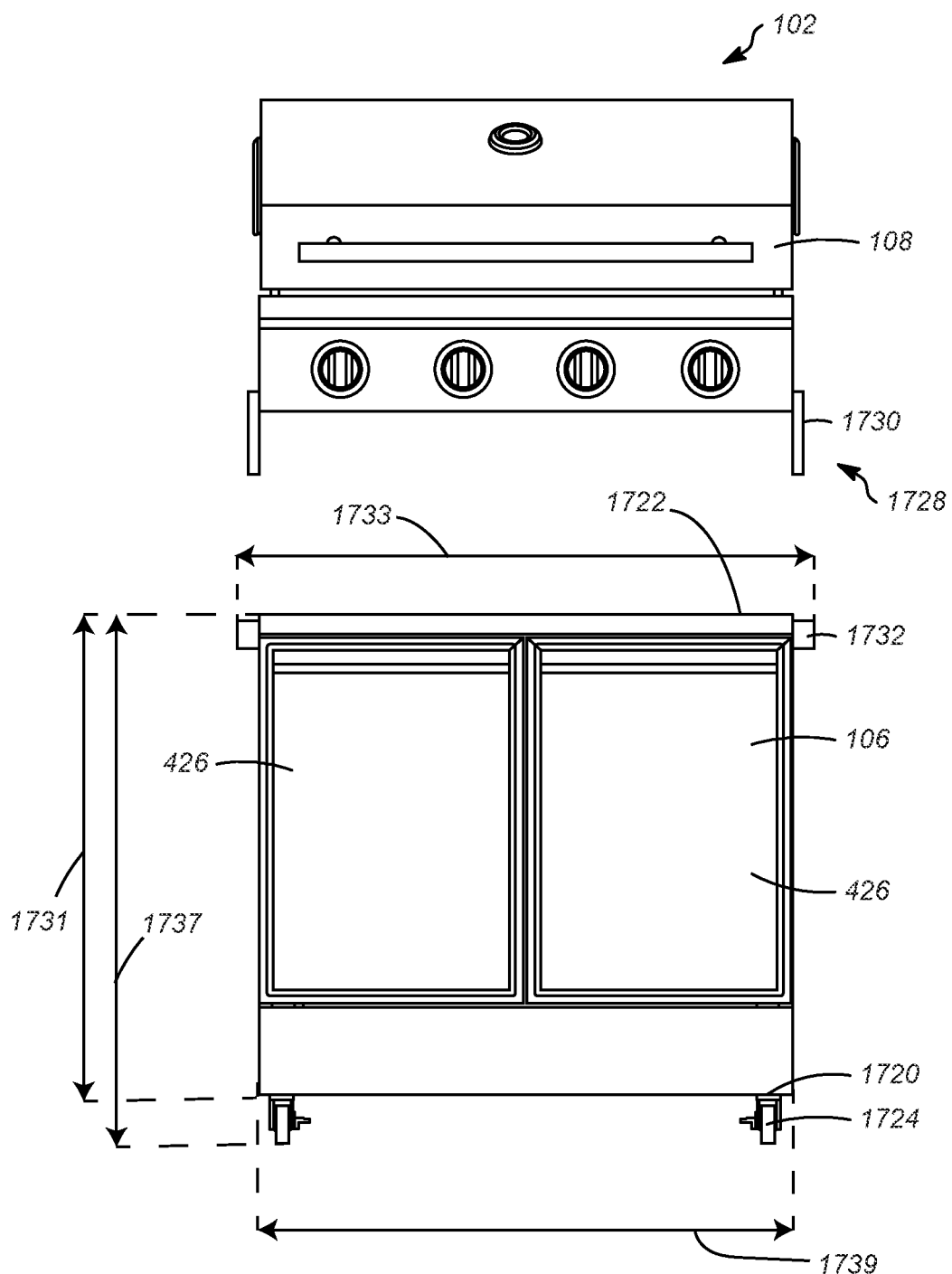
FIG. 17 is a front view of a grill assembly with a grill cart in an upright state in accordance with various embodiments herein.

Now referring to FIG. 17, in various embodiments, the grill cart 106, in the upright state, can have a height 1731, not including the wheels 1724, of at least 20 inches and not more than 30 inches, such as about 25½ inches. In various embodiments, the grill cart 106, in the upright state including the wheels 1724, can have a height 1737 of at least 25 inches and not more than 33 inches, such as about 28½ inches. In various embodiments, the grill cart 106, in the upright state, can have a width 1739, without the portions 1732 that define the apertures, of at least 25 inches and not more than 35 inches, such as about 30 inches. In various embodiments, the grill cart 106, in the upright state, can have a width 1733 including the portions 1732 that define apertures 546, 548, 550, 552 of at least 25 inches and not more than 37 inches, such as about 31½ inches. For simplicity, FIG. 17 does not illustrate the portions that define apertures 538, 540, 542, 544 on the base portion 416 of the grill cart. Now referring to FIG. 18, in various embodiments, the grill cart 106, in the upright state, can have a depth 1835 of at least 15 inches and not more than 25 inches, such as about 19½ inches.

Now referring to FIG. 6, in various embodiments, the grill assembly 102, in the folded state, can have a height 633, not including the wheels 1724, of at least 20 inches and not more than 30 inches, such as about 26¾ inches. In various embodiments, the grill assembly 102, in the folded state, can have a height, including the wheels, of at least 25 inches and not more than 35 inches, such as about 29½ inches. In various embodiments, the grill assembly 102, in the folded state, can have a width 635 identical to the width of the burner box alone, where the brackets 729 of the burner box define its widest point, as described herein with respect to FIG. 7. For simplicity of illustration, the brackets 729 are not shown in FIG. 6 or 17. In various embodiment, the grill assembly 102, in the folded state, can have a depth 631 of at least 20 inches and not more than 30 inches, such as about 24½ inches.

Figure 18:
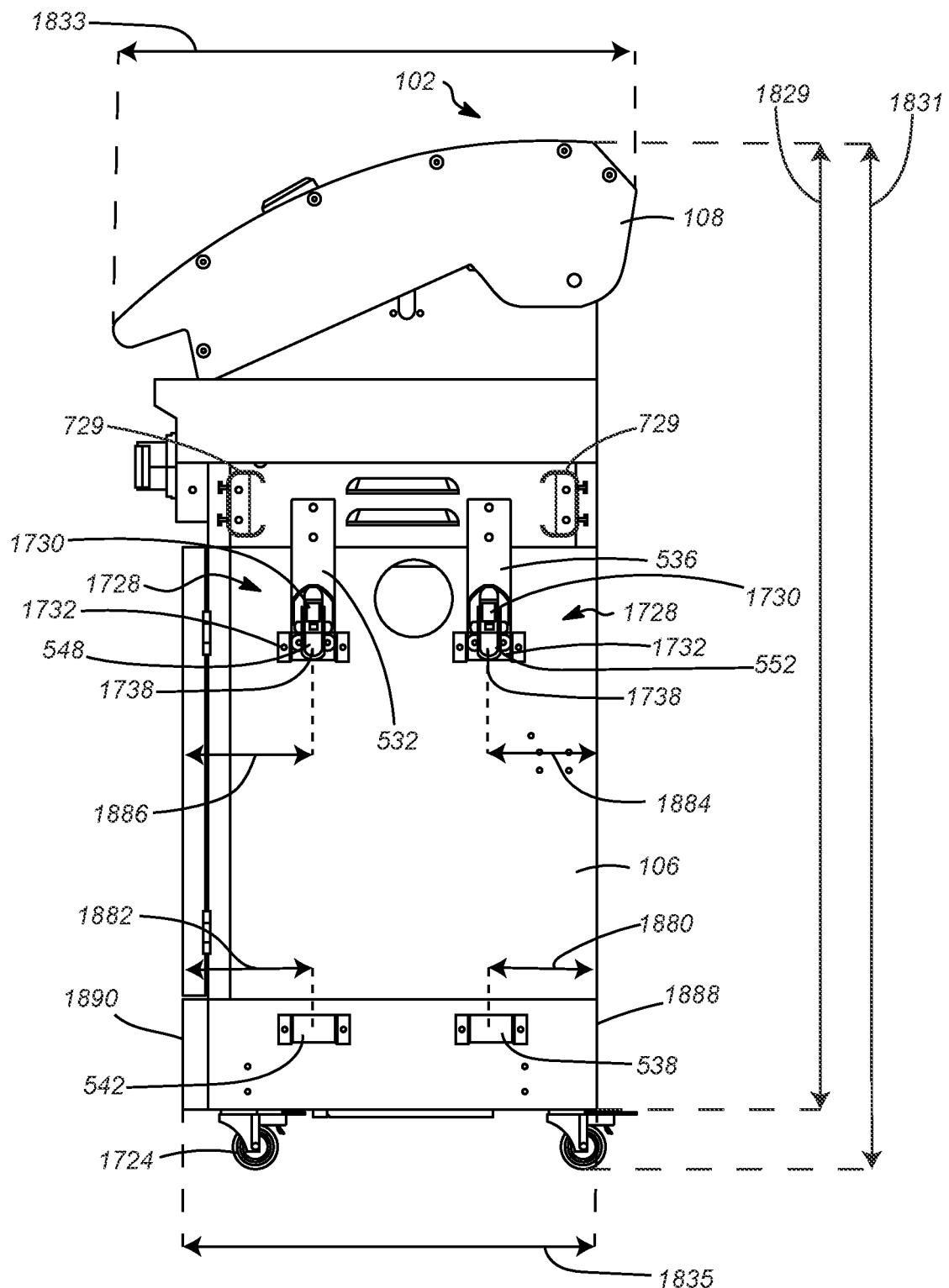
FIG. 18 is a side view of a grill assembly with a grill cart in an upright state in accordance with various embodiments herein.

Now referring to FIG. 18, in various embodiments, the grill assembly 102, in the upright state, can have a height 1831, of at least 40 inches and not more than 55 inches, such as about 47½ inches. In various embodiments, the grill assembly 102, in the upright state, can have a height 1829, not including the wheels 1724, of at least 38 inches and not more than 53 inches, such as about 44½ inches.

In various embodiments, the grill assembly 102 includes a burner box 108 coupled to a grill cart 106 in a folded state can have a maximum volume of 42,000 inches$^3$ and a minimum volume of 15,000 inches$^3$, such as about 25300 inches$^3$. The grill assembly 102 can have a maximum volume of 42,000 inches$^3$, such that the grill assembly 102 could fit into a rectangular prism (such as a box) with a minimum volume of 42,000 inches$^3$. Similarly, the grill assembly 102 can have a minimum volume of 15,000 inches$^3$, such that the grill assembly 102 could fit into a rectangular prism with a maximum volume of 15,000 inches$^3$. In various embodiments, the wheels (shown in FIG. 17) can be uncoupled or not attached in their intended locations on the bottom of the grill cart 106, such as to reduce the volume of the grill assembly 102 when the grill cart 106 is in the folded state and the burner box 108 is coupled to the folded grill cart 106. In other embodiments, the wheels can be coupled or attached to the bottom of the grill cart 106, such as to make the assembly process of the grill system 100 easier.

In various embodiments, the front frame 418 can be coupled to a front edge 419 of the base portion 416. In the folded state, the top edge of the front frame 418 (the edge that is not coupled to the base portion 416) can extend past the fourth or back edge 425 of the base portion 416 which the back frame 424 is coupled to (as shown in FIG. 6). In some embodiments, the front frame 418 extending past the base portion 416 can be a result of the length of the front frame 418 being greater than the depth of the base portion 416. The front face 654 of the burner box 108 can be aligned with the top edge of the front frame 418. In various embodiments the front face 654 can include control elements 655, such as to control the temperature level inside the burner box 108. In various embodiments, the front face 654 can include an opening to access the interior of the burner box 108. In some embodiments, the front face 654 can include a handle 657, such as to be used to open the burner box 108. In some embodiments the front face 654 can include a temperature gauge 659.

In various embodiments, the burner box 108 can be uncoupled from the grill cart 106, such as shown in FIG. 7. FIG. 7 shows the burner box 108 uncoupled and separated from the folded grill cart 106, such as lifted up away from the grill cart 106. In various embodiments, the burner box 108 can be separated from the folded grill cart 106 such that the either of the two components can be rotated or moved without affecting the other component.

In some embodiments, separating the burner box 108 from the grill cart 106 involves removing one or more projections extending from the burner box 108 from one or more apertures in the base portion 416 of the grill cart 106. In an embodiment, separating the burner box 108 from the grill cart 106 in the folded state includes removing the first projection 530 of the burner box 108 and a second projection 532 of the burner box 108 from a first aperture 538 in the base portion 416 of the grill cart 106 and a second aperture 540 in the base portion 416 of the grill cart 106.

The projections extending from the burner box 108 can be long enough such that the projections can be coupled to the base portion 416 of the grill cart 106 in the folded state, as well as to be coupled to the side frames 420, 422 in the upright state.

In various embodiments, a top portion 756 of the folded grill cart 106 can be substantially planar or flat, such as to accommodate the bottom of the burner box 108 to be placed on. In some embodiments, the top portion 756 is free of projections that extend upwards or away from the top portion 756, such that the burner box 108 is able to rest level on top of the folded grill cart 106. In some embodiments, the top portion 756 of the folded grill cart 106 can include the front frame 418 of the grill cart 106.

As mentioned above, when the burner box 108 is coupled to the grill cart 106 in the folded state, the front 654 of the burner box 108 can be aligned with the back of the base portion 416. After the burner box 108 is uncoupled from the folded grill cart 106, the burner box 108 can be rotated 180 degrees relative to the grill cart 106, such as to align the front 654 of the burner box 108 with the front of the grill cart 106. The 180 degree rotation of the burner box 108 relative to the grill cart 106 can be seen by comparing FIG. 7 with FIG. 8. In some embodiments, the burner box 108 can be rotated 180 degrees relative to the grill cart 106 when the grill cart 106 is in the folded state, when the grill cart 106 is in the upright state, or when the grill cart 106 is in a partially upright state.

FIG. 9 shows a perspective view of the grill cart 106 in the folded state in accordance with various embodiments. In various embodiments, the grill cart 106 in a folded state can have a maximum volume of 14,700 inches$^3$ and a minimum volume of 2,250 inches$^3$, such as about 7100 inches$^3$. The grill cart 106 can have a maximum volume of 14,700 inches$^3$, such that the grill cart 106 could fit into a rectangular prism (such as a box) with a minimum volume of 14,700 inches$^3$. Similarly, the grill cart 106 can have a minimum volume of 2,250 inches$^3$, such that the grill cart 106 could fit into a rectangular prism with a maximum volume of 2,250 inches$^3$.

FIG. 10 shows a cross-sectional view of the grill cart 106 taken along the line 10-10 of FIG. 9 in accordance with various embodiments herein. In some embodiments, the base portion 416 can include a bottom plate 1058 and an outer wall 1060, where the outer wall 106 includes four portions, one on each of the four sides of the bottom plate 1058. In various embodiments, in a folded state the front frame 418 can be substantially parallel to the bottom plate 1058 of the base portion 416. Similarly, in the folded state, one or more of the first side frame 420, the second side frame 422, and the back frame 424 can be substantially parallel with the bottom plate 1058. In some embodiments, the first side frame 420, the second side frame 422, and the back frame 424 can all be substantially parallel with the bottom plate 1058. In various embodiments, "substantially parallel" can refer to two components that are within 15 degrees of parallel, within 10 degrees of parallel, within 5 degrees of parallel, within 3 degrees of parallel, within 1 degree of parallel, or are parallel.

In some embodiments, the first side frame 420 and the second side frame 422 can be disposed between the front frame 418 and the back frame 424. In some embodiments, the back frame 424 can be located underneath the second side frame 422. In some embodiments, the second side frame 422 can be located underneath the first side frame 420. In some embodiments, the first side frame 420 can be located underneath the front frame 418.

In some embodiments, at least a portion of the front frame 418 overlaps at least a portion of the back frame 424, such as at least a portion of the front frame 418 can be located above or below a portion of the back frame 424. In some embodiments, at least a portion of the first side frame 420 overlaps at least a portion of the second side frame 422, such as at least a portion of the first side frame 420 can be located above or below a portion of the second side frame 422. In various embodiments, "overlap" can refer to two components being located in different horizontal planes but intersecting a common vertical plane. "Overlap" can refer to a component being located above or below another component.

In some embodiments, a gap can be disposed between two adjacent frames in the folded state, such as a gap between the first side frame 420 and the second side frame 422 as shown in FIG. 10. In some embodiments, the couplings 1062, 1066 can prevent a frame from rotating past 90 degrees, such as to maintain the parallel or substantially parallel arrangement of the frames. In some embodiments, there is not a gap between two adjacent frames in the folded state, such as the first side frame 420 contacting and resting on the second side frame 422.

In some embodiments, the base portion 416 can include an outer wall 1060 extending perpendicular or substantially perpendicular to the bottom plate 1058. In some embodiments, the first side frame 420, the second side frame 422, and the back frame 424 can fit within the outer wall 1060. In some embodiments, the outer wall 1060 can have a consistent height. In some embodiments, the outer wall 1060 can extend around the perimeter of the bottom plate 1058 and extends upward.

In some embodiments, the coupling 1062 between the first side frame 420 and the base portion 416 can be located in a first plane that is parallel with a plane defined by a bottom plate 1058 of the base. The first plane and the plane defined by the bottom plate 1058 can be a first distance 1064 away from each other. The coupling 1066 between the second side frame 422 and the base portion 416 can be located in a second plane that is parallel with the plane defined by the bottom plate 1058. The second plane and the plane defined by the bottom plate 1058 can be a second distance 1068 away from each other. The coupling 1062 and the coupling 1066 can both be located on the same side of the base portion 416. In various embodiments, the first distance 1064 is not equivalent to the second distance 1068. In some embodiments, the first distance 1064 is greater than the second distance 1068, such as by an amount that is equivalent to the thickness of the second side frame 422.

In various embodiments, the first side frame 420 and the second side frame 422 can be different heights to account for the difference between the first distance 1064 and the second distance 1068. In various embodiments, in the upright state, the top of the first side frame 420 and the top of the second side frame 422 can be an equal distance away from the bottom plate 1058. The difference in height of the first side frame 420 and the second side frame 422 can be equivalent to the difference between the first distance 1064 and the second distance 1068.

Figure 11:
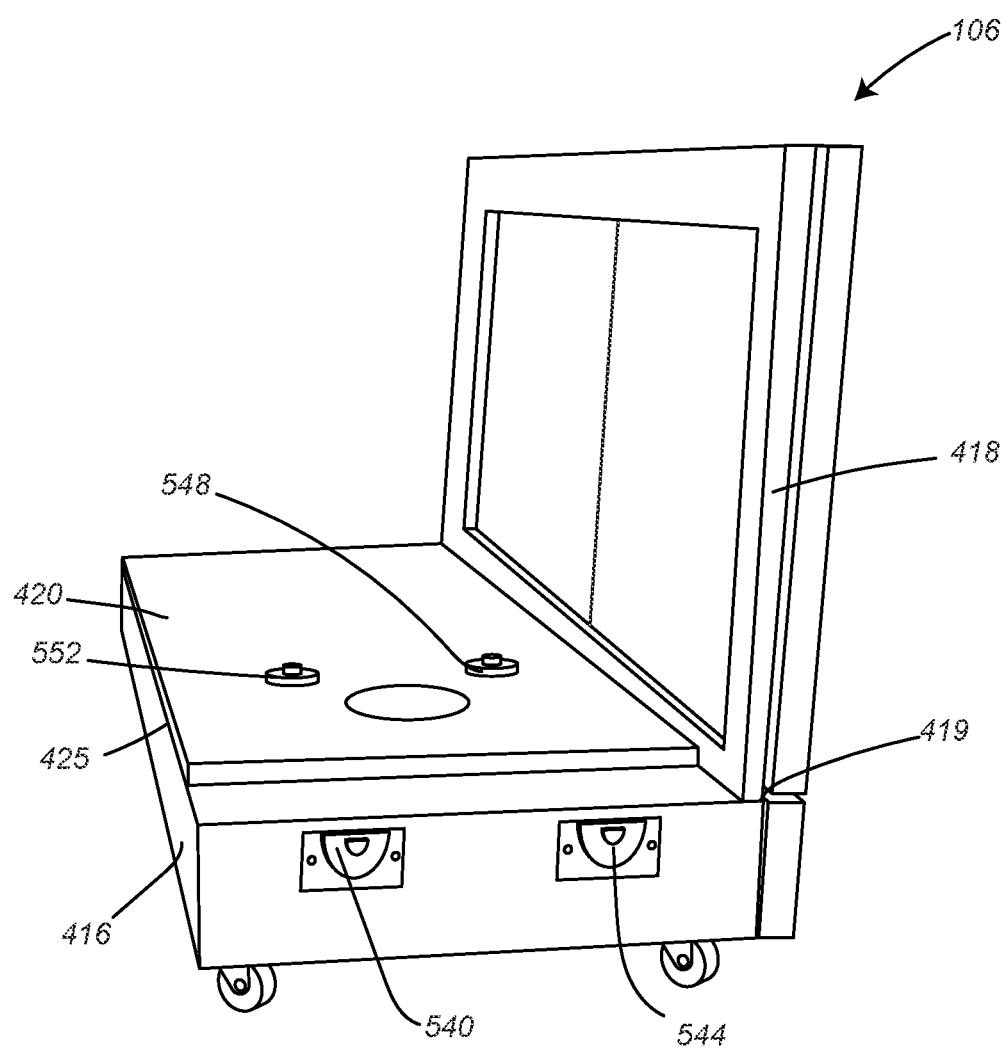
FIG. 11 is a perspective view of a grill cart with a front frame in an upright state in accordance with various embodiments herein.

FIGS. 11-15 depict an embodiment of the order in which the frames can be rotated into their upright positions. In some embodiments, the front frame 418 can be the first frame to be transitioned or rotated into its upright state, such that the remaining frames remain in their folded states. FIG. 11 shows a perspective view of a grill cart 106 with the front frame 418 in the upright state, and the remaining frames in the folded state. The grill cart 106 shown in FIG. 11 is in a configuration between a folded state and an upright state.

Figure 12:
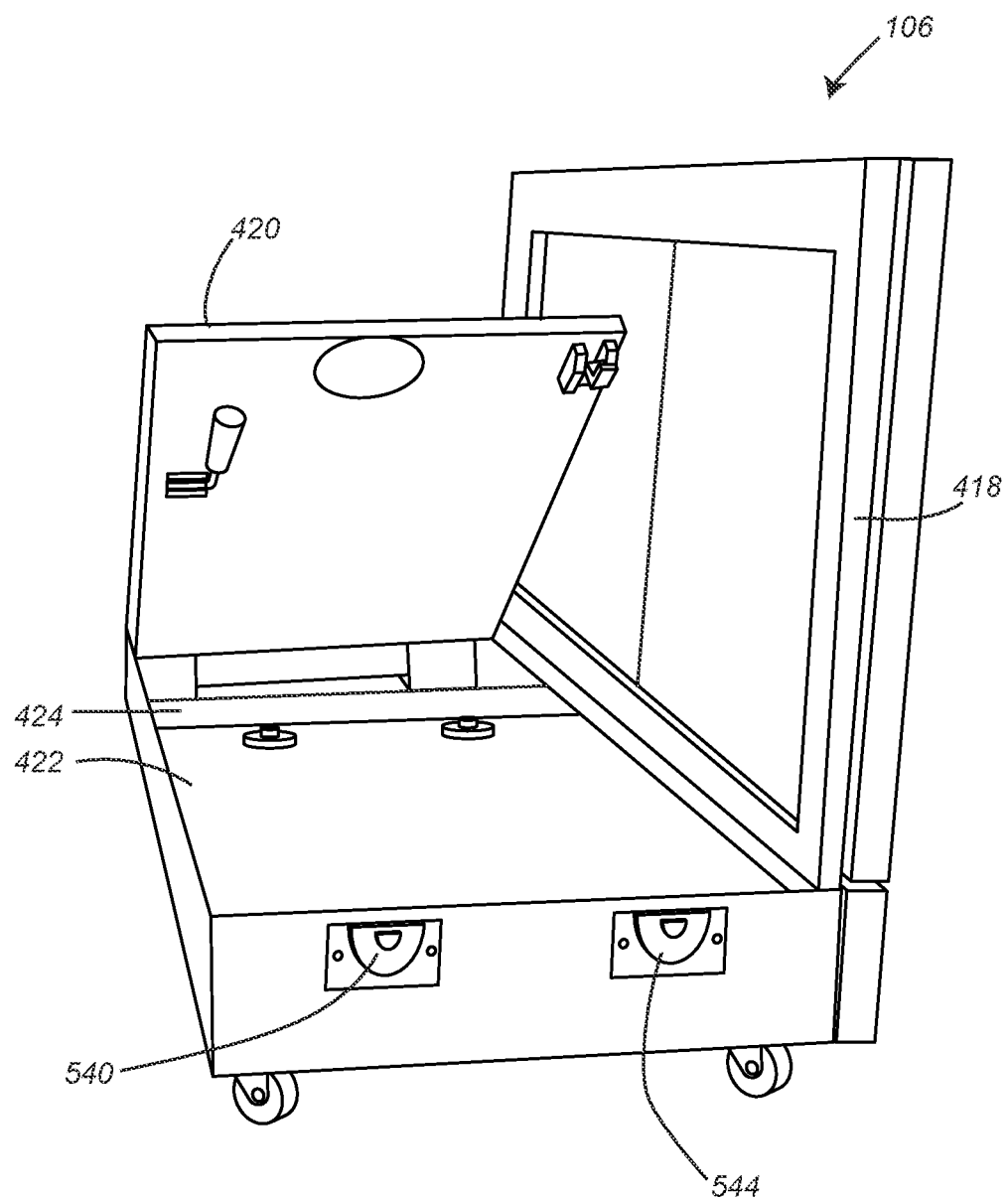
FIG. 12 is a perspective view of a grill cart with a first side frame in a partially upright state in accordance with various embodiments herein.

In some embodiments, the side frames 420, 422 can be transitioned or rotated into the upright state after the front frame 418. In some embodiments, the first side frame 420 can be the second frame to be transitioned into the upright state. FIG. 12 shows the first side frame 420 being transitioned from the folded state to the upright state.

In various embodiments, the second side frame 422 can be transitioned or rotated into the upright state after the first side frame 420. In some embodiments, the second side frame 422 can be the third frame to be transitioned into the upright state. FIG. 13 shows the front frame 418, the first side frame 420, and the second side frame 422 in the upright state.

FIG. 13 further shows the back frame 424 transitioning or rotating into the upright state after the second side frame 422. In some embodiments, the back frame 424 can be the fourth or final frame to be transitioned into the upright state.

Figure 14:
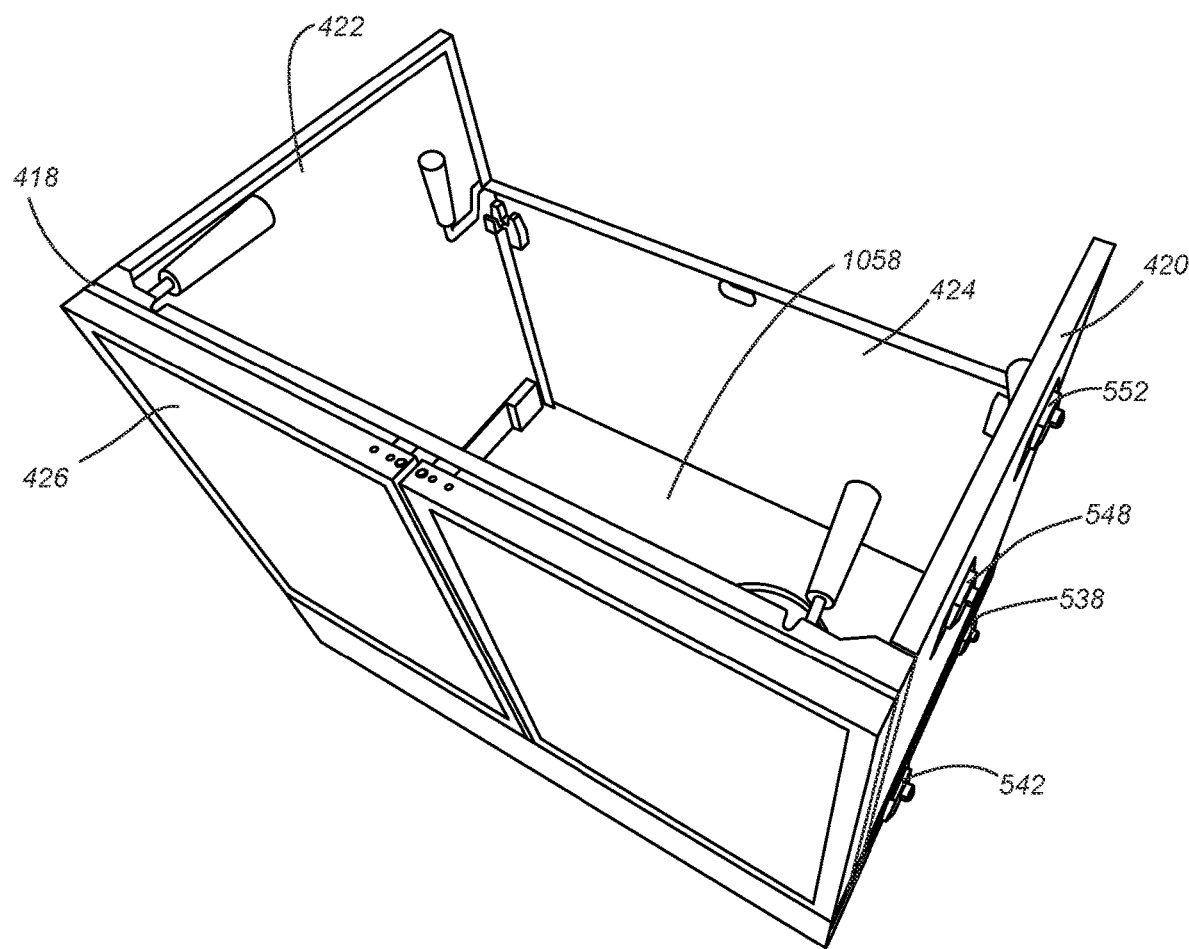
FIG. 14 is a perspective view of a grill cart in an upright state in accordance with various embodiments herein.

FIG. 14 shows a grill cart 106 in the upright state in accordance with various embodiments herein. The front frame 418, the first side frame 420, the second side frame 422, and the back frame 424 are all in the upright state. The frames can be substantially perpendicular to the bottom plate 1058 of the base portion 416. In various embodiments, "substantially perpendicular" can refer to two components that are within 15 degrees of perpendicular, within 10 degrees of perpendicular, within 5 degrees of perpendicular, within 3 degrees of perpendicular, within 1 degree of perpendicular, or are perpendicular.

Figure 15:
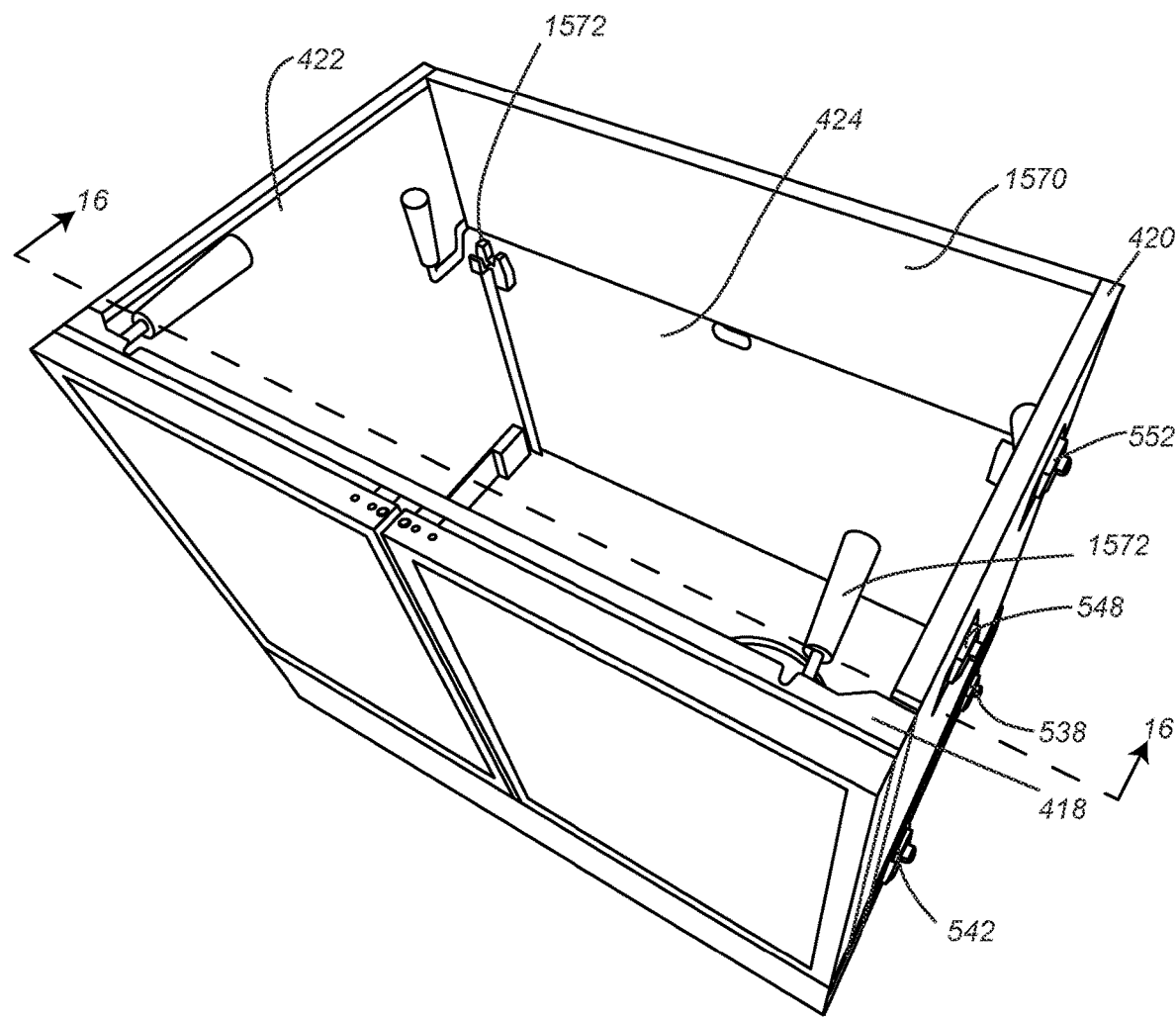
FIG. 15 is a perspective view of a grill cart in an upright state in accordance with various embodiments herein.

In some embodiments, the back frame 424 can be shorter than the other frames, such as to allow the back frame 424 to not extend passed the coupling between the front frame 418 and the base portion 416 in the folded state. In some embodiments, the back frame 424 and the two side frames 420, 422 can define a void. In some embodiments, the void can be filled or occupied by a second back frame 1570 as shown in FIG. 15. FIG. 15 is a perspective top view of a grill cart 106 in an upright position with a second back frame 1570 attached to the first back frame 424.

In various embodiments, the grill cart 106 can further include a second back frame 1570. The second back frame 1570 can be moved to a position in which the second back frame 1570 is coplanar with the back frame 424. In various embodiments, the second back frame 1570 can be coupled to the back frame 424. In some embodiments, the first side frame 420 and the second side frame 422 can each define a slot, which the second back frame 1570 can be slide into and supported by. In some embodiments, the second back frame 1570 can be rotatably coupled to the back frame 424, such as via a piano hinge. In such embodiments, the second back frame 1570 can be rotated from a position where the second back frame 1570 is parallel or substantially parallel with the back frame 424 to a position where the second back frame 1570 is substantially co-planar with the back frame 424. In other embodiments, the second back frame 1570 can expand or slide out from the back frame 424, such as in a telescoping manner. In some embodiments, the second back frame 1570 can be coupled to the back frame 424 via a butt joint.

In various embodiments, the one or more of the frames 418, 420, 422, 424 can include locking elements 1572, such as described in co-owned U.S. application Ser. No. 15/937, 666, which is hereby incorporated by reference in its entirety. Once the grill cart 106 is in the upright state, the frames can be locked in the upright state via the locking elements 1572. In some embodiments, the locking elements 1572 can provide a compression coupling, such that the locking elements 1572 provide a compressive force that pulls the frames together. In some embodiments, the locking elements 1572 can include hook on one frame, and a loop or a slot on an adjacent frame, such that the hook can mate with the loop or slot to couple the frames together. In some embodiments, the locking elements 1572 can include metal, such as to provide rigidity and strength to the coupling or locking of the frames in the upright state.

In reference now to FIG. 16, a cross-section view of the grill cart 106 taken along line 16-16 in FIG. 15 is shown in accordance with various embodiments herein. In some embodiments, in the upright state, the first side frame 420 can be parallel or substantially parallel with the second side frame 422. Similarly, the front frame 418 can be parallel or substantially parallel with the back frame 424 and the second back frame 1570. In various embodiments, in the upright state, the first and second side frames 420, 422 can be perpendicular or substantially perpendicular to the front frame 418, the back frame 424, and the second back frame 1570.

In some embodiments, a first outer side 1674 of the grill cart 106 can be defined by a first side portion 1675 of the outer wall 1060 of the base portion 416 and the first side frame 420. In some embodiments, a second outer side 1676 can be opposite from the first outer side 1674 and can be defined by a second side portion 1677 of the outer wall 1060 and the second side frame 422. In various embodiments, the first side portion 1675 and the second side portion 1677 can have the same height. In various embodiments, the different coupling locations of the first and second side frames 420, 422 to the base portion 416 can be covered or made non-visible by the outer wall 1060, such that the first side frame 420 and the second side frame 422 can appear to have the same height and the same coupling location with regards to the bottom plate 1058. The difference between first distance 1064 can the second distance 1068 is not visible. The outer wall 1060 can cover or hide the couplings 1062, 1066. The outer wall 1060 can extend from a location below all of the couplings between the frames and the base portion 416 to a location above all of the couplings.

Attaching the Burner Box to the Grill Cart

After the panels are locked in the upright state, the burner box 108 can be aligned with the grill cart 106 and the burner box 108 can be coupled to the top of the grill cart 106. FIG. 17 shows a front view of a burner box 108 being aligned with the grill cart 106 in the upright configuration, such as aligning the projections 530, 532, 534, 536 with the apertures 546, 548, 550, 552. Once the burner box 108 is aligned with the grill cart 106, the burner box 108 can be detachably coupled to the grill cart 106, such as shown in FIG. 18.

In various embodiments, coupling the burner box 108 to the grill cart 106 in the upright state comprises inserting at least one projection 530, 532, 534, 536 into at least one aperture 546, 548, 550, 552. In some embodiments, the first projection 530 can be insert into the fifth aperture 546. In some embodiments, the second projection 532 can be inserted into the sixth aperture 548. In some embodiments, the third projection 534 can be inserted into the seventh aperture 550. In some embodiments, the fourth projection 536 can be inserted into the eighth aperture 552.

In various embodiments, the first aperture 538, the third aperture 542, the sixth aperture 548 and the eighth aperture 552 can be located on the same side of the grill cart 106. Similarly, the second aperture 540, the fourth aperture 544, the fifth aperture 546, and the seventh aperture 550 can be located on the same side of the grill cart 106.

The apertures 538, 540, 542, 544 can have various shapes or structure to receive a projection. In some embodiments, the apertures 538, 540, 542, 544 can be through-holes, such as shown in FIGS. 9 and 18. In some embodiments, the apertures 538, 540, 542, 544 can have a covered end, such as to define an enclosed pocket with only one opening, as shown in FIGS. 11-13. It should be understood that the shape or structure of the apertures 538, 540, 542, 544 is independent of other aspects described herein, such as the order of the frames being transitioned from the folded state to the upright state.

The grill cart 106 can provide a support or a stand for the burner box 108. The grill cart 106 can include a bottom portion 1720 and a top portion 1722 (shown in FIG. 17). The burner box 108 can be coupled to the top portion 1722 of the grill cart 106. In some embodiments, the bottom portion 1720 can include wheels 1724, or casters, such as to provide easy portability for the grill assembly 102. In some embodiments, the wheels 1724 can include a brake or lock to prevent the wheels from rotating thereby preventing the cart from moving. In various embodiments, the bottom portion 1720 can include adjustable leveling feet or adjustable leveling wheels to allow a user to adjust the height of the feet or wheels, such as to accommodate for uneven surfaces, which can be common in outdoor applications.

The doors 426 can provide access to the interior of the grill cart 106. In various embodiments, the interior of the grill cart 106 can house a gas tank. The gas tank can supply the burner box 108 with gas. In some embodiments, the interior of the grill cart 106 can be configured to house or store other related equipment, such as tongs, spatulas, or brushes.

The burner box 108 can be coupled to the grill cart 106 via one or more latch mechanisms 1728. In various embodiments, a latch mechanism 1728 can be located on or adjacent to the each of the projections 530, 532, 534, 536 and apertures 538, 540, 542, 544. In various embodiments, the burner box 108 or projection 530, 532, 534, 536 can include a first portion 1730 of each of the latch mechanisms 1728, and the grill cart 106 can include a second portion 1732 of each of the latch mechanisms 1728. FIG. 18 shows the latch mechanisms 1728 coupling the burner box 108 with the grill cart 106.

In some embodiments, the first portion 1730 can include a hoop, ring, hook, or other device that defines an opening. The example shown in FIG. 18 is a buckle structure that has a portion that rotates to move the buckle structure between open and a closed positions. The example shown in FIG. 18 has two first portions 1730 on each side of the burner box 108 and two second portions 1732 on each side of the grill cart 106.

The second portion 1732 can include a projection 1738 (FIG. 18) for mating with the loop of the buckle of the first portion 1730. The first portion 1730 can be configured to receive the projection from the second portion 1732 into the opening defined by the loop. In various embodiments, the first portion 1730 can transition between an open position and a closed position. In the open position the opening can easily receive the projection. In the closed position, the projection can be secured in the opening. In other embodiments, the second portion 1732 can include a hoop, ring, hook, or other device that defines an opening, and the first portion 1730 can include a projection for mating with the loop of the second portion 1732. Other options for coupling a burner box to a grill cart are described in co-owned U.S. application Ser. No. 15/937,666 mentioned above.

In various embodiments, a center portion of the first aperture 538 can be located a first distance 1880 away from the back 1888 of the base portion 416. In various embodiments, a center portion of the third aperture 542 can be located a second distance 1882 away from the front 1890 of the base portion 416, such as the front of the toe kick panel 114. In various embodiments, a center portion of the eighth aperture 552 can be located a third distance 1884 away from the back 1888 of the base portion 416. In various embodiments, a center portion of the sixth aperture 548 can be located a fourth distance 1886 away from the front 1890 of the base portion 416.

In various embodiments, the first distance 1880 can be equivalent to the third distance 1884. In various embodiments, the second distance 1882 can be equivalent to the fourth distance 1886. In various embodiments, the first distance 1880 and the third distance 1884 are not equivalent to the second distance 1882 and the fourth distance 1886.

In some embodiments, the first distance 1880 and the third distance 1884 are equal and can be about 3 inches, 4 inches, 5 inches, 6 inches, 7 inches, or 8 inches. In some embodiments, the first distance 1880 and the third distance 1884 are equal and can be at least 3 inches and not more than 8 inches, such as 5 inches.

In some embodiments, the second distance 1882 and the fourth distance 1886 are equal can be about 4 inches, 5 inches, 6 inches, 7 inches, 8 inches, or 9 inches. In some embodiments, the second distance 1882 and the third distance 1884 are equal and can be at least 4 inches and not more than 9 inches, such as 6¼ inches.

Now referring to FIG. 6, in various embodiments, in the folded state, the front face 654 of the burner box 108 can be aligned with the back 1888 of the base portion 416. In such embodiments, the control elements 655, locking elements 1572 and other components connected to the burner box 108 and the grill cart 106 can extend past the front face 654 and the back 1888 of the base portion 416. In the embodiment of FIG. 6, in the folded state, the front frame 418 also extends past the back 1888 of the base portion 416. Both the front frame 418 in the folded state and the burner box have a depth dimension larger than the depth of the base portion 416, and both extend past the base portion 416 in the same direction, thereby minimizing the volume occupied by the grill assembly in the folded state.

Door Construction

Figure 19:
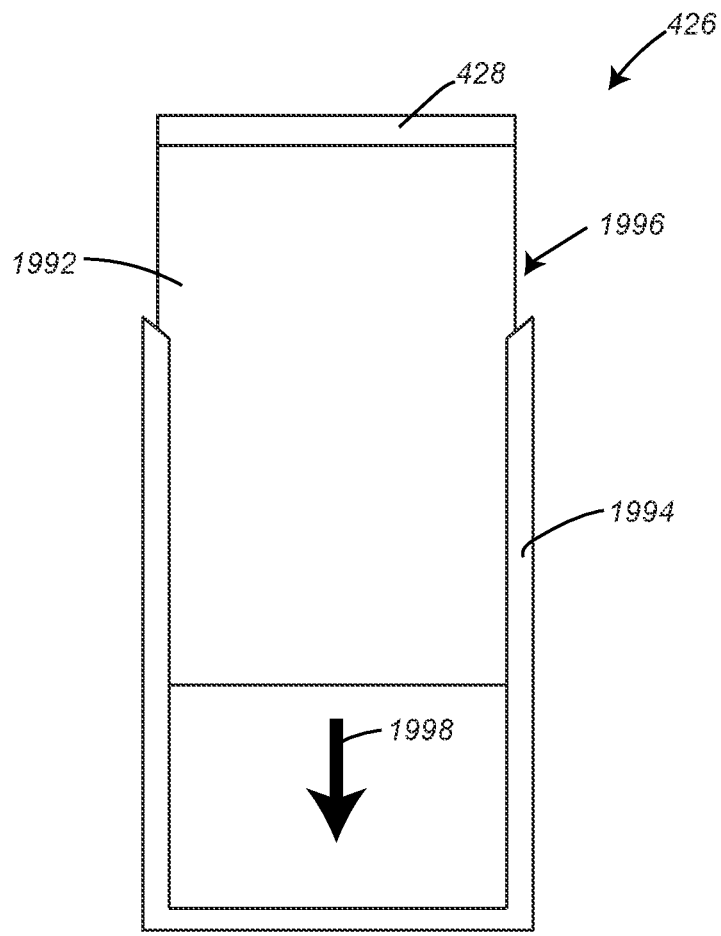
FIG. 19 is a front view of a door being assembled in accordance with various embodiment herein.
Figure 20:
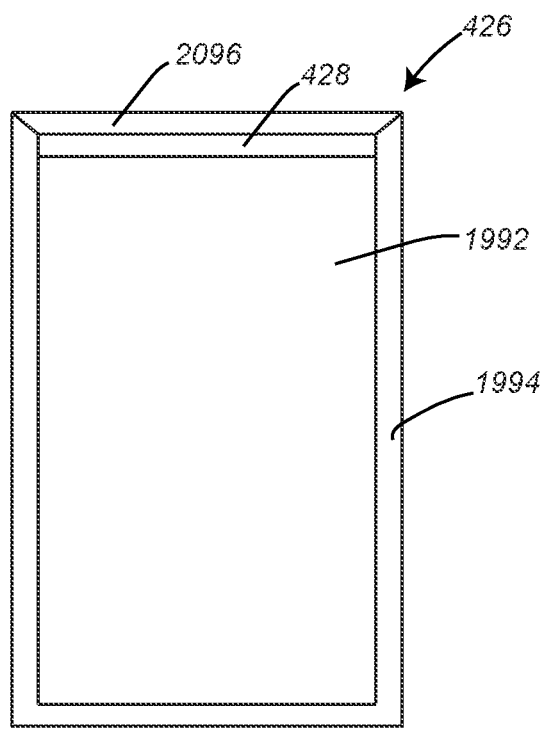
FIG. 20 is a front view of a door in accordance with various embodiment herein.

FIG. 19 shows a front view of a door 426 being assembled in accordance with various embodiment herein. FIG. 20 shows a front view of an assembled door 426. In various embodiments, the door 426 can include a panel 1992 and an outer frame 1994. The outer frame 1994 can have an open end 1996. The panel 1992 can be inserted into the frame 1994 through the open end 1996 as shown by arrow 1998 in FIG. 19. A recessed handle 428 can be formed by the panel 1992 along a top edge.

After the panel 1992 is fully inserted into the frame 1994, a cap portion 2096 can be added to the outer frame 1994. The cap portion 2096 can enclose the outer frame 1994, such as to retain the panel 1992 within the outer frame 1994.

Figure 21:
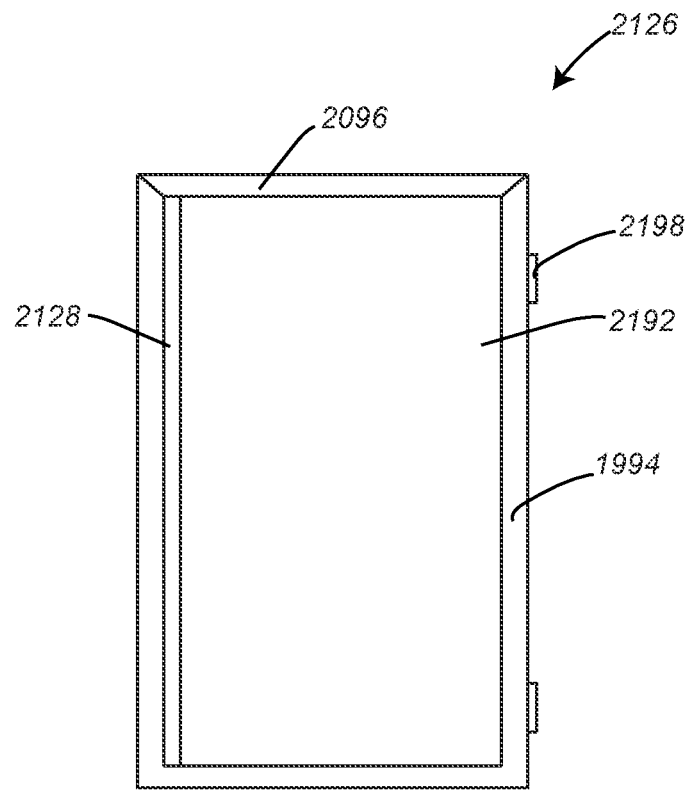
FIG. 21 is a front view of a door in accordance with various embodiment herein.

FIG. 21 shows a front view of an alternate door 2126 having a vertical handle 2128 that extends vertically along a side of the door 2126. The door 2126 is formed by a panel 2192 surrounded by a frame 1994 and a cap portion 2096. The door 2126 shown in FIG. 21 can be universal, such that the door hinges 2198 can be on the left or the rights, such as by rotating the door 2126 by 180 degrees thereby moving the cap portion 2096 to the bottom of the door 426.

Methods

FIG. 22 shows a flow chart depicting a method 2200 in accordance with various embodiments herein. In some embodiments, the method 2200 can include transitioning a grill cart form a folded state to an upright state, step 2202. The method 2200 can further include aligning a burner box with the grill cart in the upright state, step 2204. The method 2200 can further include coupling the burner box to the grill cart, step 2206.

FIG. 23 shows a flow chart depicting a method 2300 in accordance with various embodiments herein. In some embodiments, the method 2300 can include uncoupling a burner box from a grill cart in a folded state, step 2302. The method 2300 can include separating the burner box from the grill cart, step 2304. In various embodiments, the method 2300 can further include transitioning the grill cart from a folded state to an upright state, step 2306.

In some embodiments, transitioning the grill cart from a folded state to an upright state can include rotating a front frame from a folded state to an upright state, step 2308. Transitioning the grill cart from a folded state to an upright state can further include rotating a first side frame and a second side frame from a folded state to an upright state, step 2310. Transitioning the grill cart from a folded state to an upright state can also include rotating a back frame from a folded state to an upright state, step 2312. In some embodiments, transitioning the grill cart from a folded state to an upright state include first rotating the front frame, then the two side frames, and finally the back frame. In other embodiments, the back frame can be rotated first, followed by rotating the two side frames, and finally the front frame. In other embodiments, one side frame can be rotated first, followed by the front and back frames, and finally the second side frame. It should be understood that other orders in which the frames are rotated are possible and included herein.

The method 2300 can include rotating the grill cart 180 degrees relative to the burner box, step 2314. Rotating the grill cart 180 degrees relative to the burner box can involve rotating the grill cart, the burner box, or both. Rotating the grill cart 180 degrees relative to the burner box can take place after the burner box is separated from the grill cart and before the burner box is recoupled to the grill cart, such as step 2314 taking place before step 2306.

The method 2300 can further include aligning the burner box with the grill cart in the upright state, step 2316. The method 2300 can include coupling the burner box to the grill cart in the upright state 2318.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A grill comprising:
a grill cart configured to be transitioned between an upright state and a folded state; and
a burner box configured to be detachably coupled to the grill cart in the folded state and in the upright state;
wherein the grill cart comprises:
a base comprising a first side, a second side, a third side, and a fourth side; and
a front frame coupled to the first side of the base in the upright state and the folded state;
wherein, in the folded state, a top portion of the front frame extends beyond the second side of the base.

2. The grill of claim 1, further comprising:
a first side frame coupled to the third side of the base via a first coupling in the upright state and the folded state; and
a second side frame coupled to the fourth side of the base via a second coupling in the upright state and the folded state.

3. The grill of claim 2, further comprising:
a back frame coupled to the second side of the base in the upright state and the folded state.

4. The grill of claim 3, wherein a height of the back frame is less than a height of the front frame.

5. The grill of claim 4, wherein the height of the back frame is less than a height of the first side frame and a height of the second side frame.

6. The grill of claim 5, wherein the height of the front frame is equivalent to the height of the first side frame and the height of the second side frame.

7. The grill of claim 6, wherein the height of the first side frame is equal to or less than a width of the front frame and the height of the second side frame is equal to or less than the width of the front frame.

8. The grill of claim 7, wherein the height of the back frame is equal to or less than a width of the first side frame and a width of the second side frame.

9. The grill of claim 3, wherein, in the folded state, the back frame, the first side frame, and the second side frame are disposed between the base and the front frame.

10. The grill of claim 9, wherein, in the folded state, the first side frame and the second side frame are disposed between the back frame and the front frame.

11. The grill of claim 3, the base further comprising: a first side portion along the third side, and a second side portion along the fourth side of the base;
wherein, in the folded state, the back frame, the first side frame, and the second side frame are disposed within the base, such that the back frame, the first side frame, and the second side frame are disposed between a bottom portion of the base and a top portion of the first side portion and a top portion of the second side portion.

12. The grill of claim 1, wherein, in the folded state, the back frame, the first side frame, the second side frame, and the front frame are parallel.

13. The grill of claim 2, wherein the first coupling is disposed at a first distance from the base and the second coupling is disposed at a second distance from the base,
wherein the first distance is not equivalent to the second distance.

14. The grill of claim 1, wherein the base defines a first aperture and a second aperture, and the burner box comprises a first projection and a second projection;
wherein, when in the folded state, the first projection is disposed within the first aperture and the second projection is disposed within the second aperture to couple the burner box to the grill cart in the folded state.

15. The grill of claim 1, wherein the first side frame defines a third aperture and the second side frame defines a fourth aperture;
wherein, when in the upright state, the first projection is disposed within the third aperture and the second projection is disposed within the fourth aperture to couple the burner box to the grill cart in the upright state.

16. The grill of claim 1, wherein the base is rectangular.

17. A grill comprising:
a grill cart configured to be transitioned between an upright state and a folded state; and
a burner box configured to be detachably coupled to the grill cart in the folded state and in the upright state;
wherein the grill cart comprises:
a base comprising a first side, a second side, a third side, a fourth side, a first side portion along the third side, and a second side portion along the fourth side of the base;
a front frame coupled to the first side of the base in the upright state and the folded state;
a first side frame coupled to the third side of the base via a first coupling in the upright state and the folded state;
a second side frame coupled to the fourth side of the base via a second coupling in the upright state and the folded state; and
a back frame coupled to the second side of the base in the upright state and the folded state;
wherein the back frame has a height that is less than a height of the front frame, a height of the first side frame, and a height of the second side frame.

18. The grill of claim 14, wherein the height of the front frame, the height of the first side frame, and the height of the second side frame are equal.

19. The grill of claim 14, wherein the height of the front frame is greater than a depth of the base.

20. A grill comprising:
a grill cart configured to be transitioned between an upright state and a folded state; and
a burner box configured to be detachably coupled to the grill cart in the folded state and in the upright state;
wherein the grill cart comprises:
a rectangular base comprising a first side, a second side, a third side, a fourth side, a first side portion along the third side, and a second side portion along the fourth side of the base;
a front frame coupled to the first side of the base in the upright state and the folded state;
a first side frame coupled to the third side of the base via a first coupling in the upright state and the folded state;
a second side frame coupled to the fourth side of the base via a second coupling in the upright state and the folded state; and
a back frame coupled to the second side of the base in the upright state and the folded state;
wherein a height of the back frame is less than a height of the front frame;
wherein the height of the front frame is greater than a depth of the base;
wherein, in the folded state, a top portion of the front frame extends beyond the second side of the base;
wherein, in the folded state, the back frame, the first side frame, and the second side frame are disposed within the base;
wherein, in the folded state, the back frame, the first side frame, the second side frame, and the front frame are parallel;
wherein, in the folded state, the back frame, the first side frame, and the second side frame are disposed between the base and the front frame.

* * * * *